United States Patent [19]
Narita et al.

[11] Patent Number: 5,970,294
[45] Date of Patent: Oct. 19, 1999

[54] CYLINDRICAL STRUCTURAL BODY FOR USE IN AN IMAGE FORMING APPARATUS AND METHOD OF PRODUCING THE SAME

[75] Inventors: Kenji Narita; Yasuhiro Hujimori; Tsuyoshi Imamura; Makoto Nakamura; Kyota Koetuka; Kenichi Ishiguro; Takeo Araki; Takahiro Yasunaga, all of Kanagawa, Japan

[73] Assignee: Ricoh Company, Ltd., Tokyo, Japan

[21] Appl. No.: 09/132,978

[22] Filed: Aug. 12, 1998

[30] Foreign Application Priority Data

| Aug. 12, 1997 | [JP] | Japan | 9-230461 |
| Nov. 10, 1997 | [JP] | Japan | 9-323800 |
| Jul. 28, 1998 | [JP] | Japan | 10-227653 |

[51] Int. Cl.⁶ .......................... G03G 15/08; G03G 15/00
[52] U.S. Cl. ................ 399/286; 399/279; 29/895.22; 29/725; 492/47
[58] Field of Search .................. 399/286, 279; 29/895, 895.22, 715, 724, 725; 492/47

[56] References Cited

U.S. PATENT DOCUMENTS

| 3,941,635 | 3/1976 | Tavelle et al. ............ 156/86 |
| 4,992,767 | 2/1991 | Hozumi et al. . |
| 5,229,813 | 7/1993 | Cherian .................. 492/47 X |
| 5,237,747 | 8/1993 | Nakashima ............ 29/895.32 |
| 5,244,741 | 9/1993 | Nagano et al. . |
| 5,465,138 | 11/1995 | Jaskowiak et al. ........ 492/47 X |
| 5,599,265 | 2/1997 | Foltz ....................... 492/47 |
| 5,617,191 | 4/1997 | Murakami et al. ......... 399/286 |
| 5,739,900 | 4/1998 | Isobe ..................... 399/279 X |
| 5,842,962 | 12/1998 | Yamada et al. ............ 492/47 X |

FOREIGN PATENT DOCUMENTS

| 57-150849 | 3/1981 | Japan . |
| 59-161156 | 10/1984 | Japan . |
| 2-205874 | 8/1990 | Japan . |

*Primary Examiner*—Richard Moses
*Attorney, Agent, or Firm*—Oblon, Spivak, McClelland, Maier & Neustadt, P.C.

[57] ABSTRACT

A cylindrical structural body for use in an image forming apparatus and a method of producing the same are disclosed. The structural includes a cylindrical sleeve and flanges or similar end members respectively affixed to opposite ends of the sleeve. The flanges can be firmly and easily affixed to the sleeve without causing the sleeve to deform. The structural body is therefore low cost and highly accurate.

68 Claims, 19 Drawing Sheets

5,970,294

CYLINDRICAL STRUCTURAL BODY FOR USE IN AN IMAGE FORMING APPARATUS AND METHOD OF PRODUCING THE SAME

BACKGROUND OF THE INVENTION

The present invention relates to a copier, facsimile apparatus, laser printer or similar electrophotographic image forming apparatus and, more particularly, to a developing roller included in a developing device, a cleaning roller included in a cleaning device, or similar cylindrical structural body, and a method of producing the same. Also, the present invention relates to a developing roller which is a specific form of the cylindrical structural body, a method of producing the developing roller, and a developing device including the developing roller.

A developing roller included in a developing device, a cleaning roller included in a cleaning device and other magnet rollers belong to a family of cylindrical structural elements for the above application. The rollers each includes a cylindrical sleeve and flanges or similar end members respectively affixed to axially opposite ends of the sleeve. Some different methods have heretofore been proposed in order to affix the sleeve and flanges surely and accurately. However, the conventional methods are troublesome and expensive and fail to implement the sure and accurate fixation of the sleeve and flanges. It follows that a resisting torque and a pull strength available at the portions where the sleeve and flanges are affixed together are limited.

SUMMARY OF THE INVENTION

It is therefore an object of the present invention to provide a cylindrical structural body which is simple, low cost, and high in resisting torque and pull strength, a method of producing the structural body, a developing roller which is a specific form of such a structural body, a method of producing the developing roller, and a developing device including the developing roller.

In accordance with the present invention, a cylindrical structural body includes a cylindrical sleeve, and an end member affixed to the end portion of the sleeve in the axial direction of the sleeve. The end member includes a tapered portion tapered toward the end thereof in the axial direction of the cylindrical structural body over the entire circumference of the tapered portion. The end portion of the sleeve is plastically deformed such that the inner periphery of the end portion closely contacts the tapered portion of the end member, whereby the end portion is affixed to the end member.

BRIEF DESCRIPTION OF THE DRAWINGS

The above and other objects, features and advantages of the present invention will become apparent from the following detailed description taken with the accompanying drawings in which.

DESCRIPTION OF THE PREFERRED EMBODIMENTS

Figure 1:
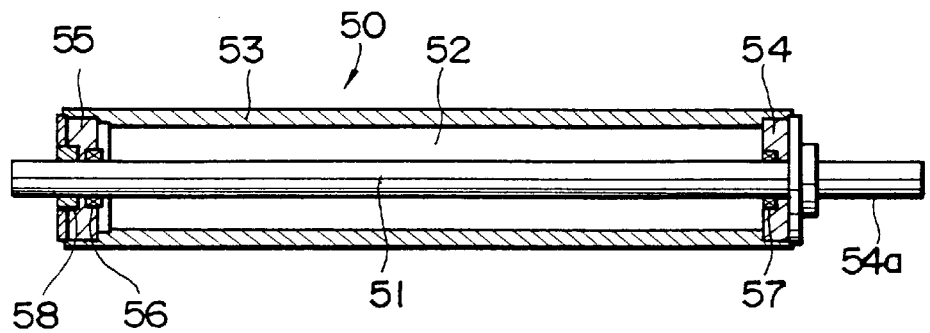
FIG. 1 is a vertical section showing a conventional magnet roller included in the developing device of an electrophotographic image forming apparatus.

To better understand the present invention, brief reference will be made to a conventional cylindrical structural body, shown in FIG. 1. As shown, the structural body is implemented as a magnet roller 50 by way of example. The magnet roller 50 includes a core 51 formed of metal. A plastic magnet or similar roller body has a plurality of stationary magnetic poles, e.g., P1–P6 (see FIG. 2). A sleeve 53 is rotatable and formed of a nonmagnetic material, e.g., aluminum. A drive flange 54 and a driven flange 55 constitute end members. The drive flange 54 is mounted on one end of the sleeve 53 in order to transmit a torque output from a drive source, not shown, to the sleeve 53. The driven flange 55 is mounted on the other end of the sleeve 53 in order to hold a magnet 52 within the sleeve 53.

Assume that the magnet roller 50 is used as a developing roller dealing with a two-ingredient type developer, i.e., a mixture of magnetic carrier and nonmagnetic toner. Then, the roller 50 is required to have a magnetic characteristic (flux density) shown in FIG. 2 specifically. The magnetic poles of the roller 50 and the rotatable sleeve 53 cooperate such that the developer is conveyed at portions where the flux density is high and is replaced, for every rotation, at the other portions where it is low.

Generally, the drive flange 54 is formed of a nonmagnetic, highly wear-resistant material, e.g., wear-resistant aluminum. The driven flange 55 is usually implemented as a plastic molding for a light weight configuration.

The prerequisite with the roller 50 is that the two flanges 54 and 55 be firmly affixed to the sleeve 53 and be concentric with the sleeve 53 without any play. Should the fixation of the drive flange 54 to the sleeve 53 be defective, the flange 54 would idle relative to the sleeve 53 and would thereby prevent it from rotating at a preselected speed. Also, should the fixation of the driven flange 55 to the sleeve 53 be defective, the flange 55 would slip out of the sleeve 53 at the time of removal of the roller 50 from an image forming apparatus. Further, any play between the sleeve 53 and the flanges 54 and 55 would make it difficult to rotate the roller 50 at a preselected speed.

Figure 3:
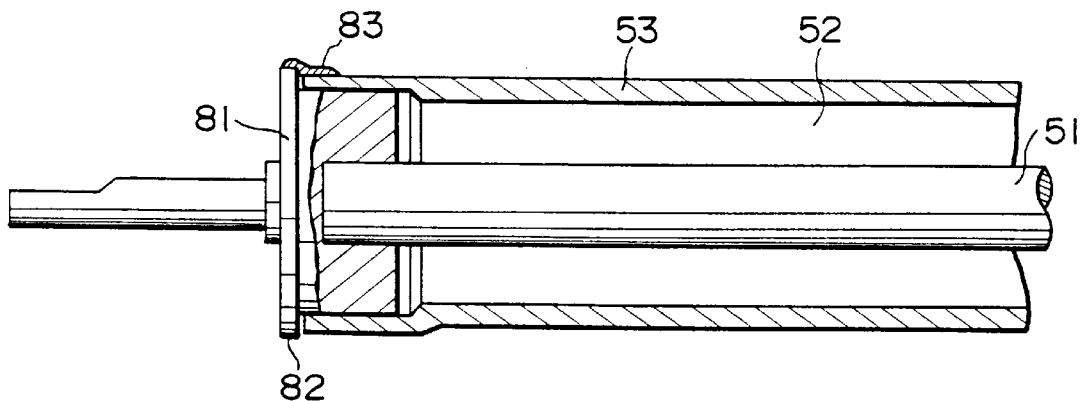
FIG. 3 demonstrates a conventional method of affixing a flange included in the magnet roller to a sleeve.
Figure 4:
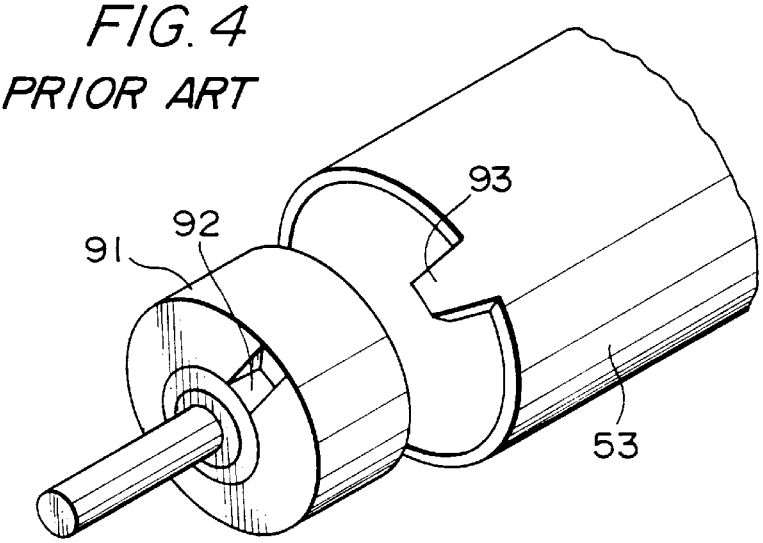
FIG. 4 demonstrates another conventional method of affixing a flange included in the magnet roller to a sleeve.
Figure 5:
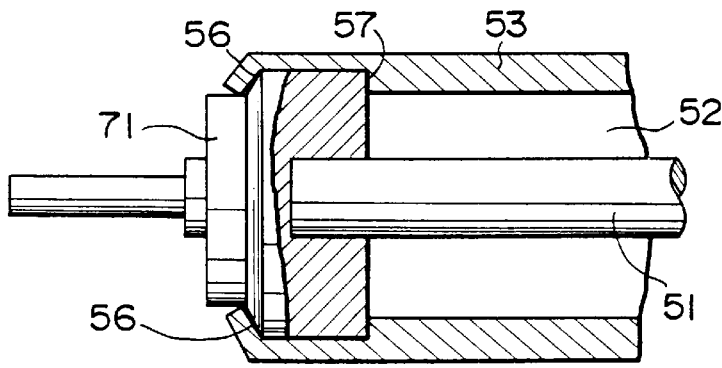
FIG. 5 is a view useful for understanding the conventional methods.

Some different methods are available for affixing the drive flange 54 and driven flange 55 to the sleeve 53. FIG. 3 shows a first conventional method. As shown, a flange 81 is provided with an outside diameter slightly smaller than the inside diameter of the sleeve 53 and formed with a collar 82. After adhesive 83 has been applied to the circumferential surface of the flange 81, the sleeve 53 is press-fitted on the flange 81 with its end abutting against the collar 82. FIG. 4 shows a second conventional method. As shown, the sleeve 53 is formed with a suitable number of lugs 93 at its end while a flange 91 is formed with holes 92 corresponding in position to the lugs 93. After the flange 91 has been press-fitted in the sleeve 53, the lugs 93 are press-fitted in and pressed by a die, not shown, including a pressing portion. FIG. 5 shows a third conventional method. As shown, the sleeve 53 is formed with a bent portion 56 at its end while a flange 71 is formed with an inclined shoulder 71a. The bent portion 56 and shoulder 71a are engaged with each other in order to affix the flange 71 to the sleeve 53.

As for the first method, the length of the sleeve 53 has its accuracy determined by the dimensional accuracy of the collar 82. However, fixation using adhesive cannot be done unless the surface of the flange 81 where the adhesive 83 is to be applied is subjected to dewaxing beforehand and unless the adhesive 83 is stored in a strictly controlled condition. Moreover, when the positive adhesion of the flange 81 to the sleeve 53 is desired, the adhesive 83 is apt to partly bulge out and deposit on the surface of the sleeve 53. Such adhesive must be removed by, e.g., a solvent. This not only renders the work troublesome, but also degrades the working environment.

The problem with the second method is that the lugs 93 formed on the sleeve 53 and the holes 92 formed in the flange 91 increase the production cost. This is also true with the third method which needs the bent portion 56 on the sleeve 53 and needs the inclined shoulder 71a on the flange 71.

Figure 6:
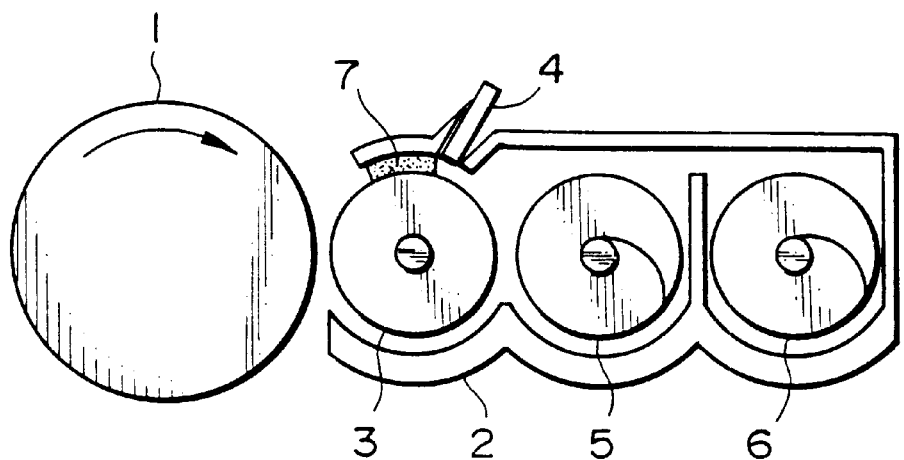
FIG. 6 shows a developing device embodying the present invention.

Referring to FIG. 6, a developing device is shown and includes a developing roller or cylindrical structural body embodying the present invention. The developing roller has a hollow cylindrical sleeve and end members affixed to axially opposite ends of the sleeve, as will be described specifically later.

As shown in FIG. 6, the developing device includes a casing 2 storing a two-ingredient type developer, i.e., nonmagnetic carrier and magnetic toner. A developing roller or developer carrier 3 conveys the developer deposited thereon to a developing region where the developing roller 3 faces a photoconductive drum or image carrier 1. A doctor 4 plays the role of a regulating member for causing the developer being conveyed toward the developing region to form a thin layer. A first and a second screw 5 and 6, respectively, convey the developer in opposite directions to each other along the axis of the developing roller 3. The developing roller 3, doctor 4 and screws 5 and 6 extend in parallel to the drum 1. The first and second screws 45 and 6 are separated from each other by a partition. The screw 5 is located in the vicinity of the developing roller 3. The screw 6 is located in the vicinity of an opening, not shown, through which fresh toner is replenished from a toner replenishing device, not shown. A space for interchanging the developer is formed between each end of the above partition in the axial direction of the developing roller 3 and the inner surface of a reference wall included in the device and facing it.

Figure 7:
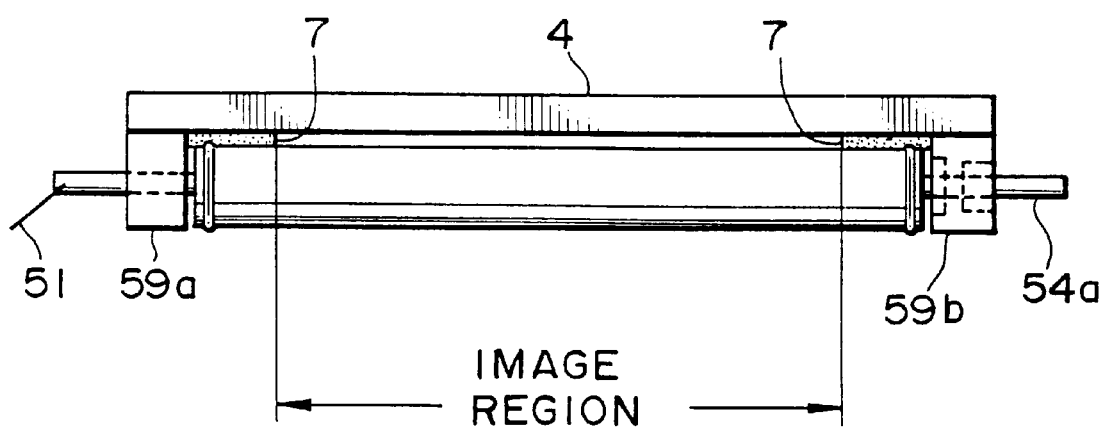
FIG. 7 shows seal members included in the developing device of FIG. 6.

A part of the casing 2 faces the developing roller 3 at a position downstream of the position where the roller 3 and doctor 4 face each other with respect to the direction of rotation of the roller 3, but upstream of the developing region with respect to the same direction. As shown in FIG. 7, the developing roller 3 includes a metallic core 51 rotatably supported by a holder or setting portion 59a, and a shaft 54a rotatably supported by another holder or setting portion 59b. Seal members 7 intervene between portions of the developing roller 3 and portions of the casing 2 facing them, as illustrated. The seal members 7 prevent the developer from depositing in regions other than the developing region. In addition, the seal members 7 prevent the developer from being scattered to the portion where the core 51 and holder 59a slide on each other and the portion where the shaft 54a and holder 59b slide on each other.

The seal members 7 each may be implemented by foam urethane, urethane sheet, or felt or similar porous material. The seal members 7 formed of such a porous material will be compressed at the time of sealing and have their cells reduced, thereby insuring stable sealing.

In the above developing device, the seal members 7 are positioned in non-image regions outside of, in the axial direction of the developing roller 3, an image region corresponding to the region of the roller 3 expected to carry the developer. In this condition, even when the seals 7 are positioned upstream of, in the direction of rotation of the developing roller 3, the developing region or developer feed region where the roller 3 feeds the developer to the drum 1 or when they are positioned in the developing region in the above direction, the roller 3 can perform its developing operation.

The first screw 5 conveys the developer to the front or viewer's side of the developing device, as seen in the direction perpendicular to the sheet surface of FIG. 6. A part of this developer not deposited on the developing roller 3 is transferred to the second screw via front one of the previously mentioned spaces. The second screw 6 conveys the developer to the rear of the developing device, as seen in the above direction, so that the developer is again transferred to the first screw 5 via the rear space. While the developer is so circulated around the partition by the screws 5 and 6, its toner and carrier are uniformly distributed. Such a developer is deposited on the developing roller 3 due to the magnetic force of the roller 3 and conveyed to the drum 1 thereby.

A latent image representative of a document image is formed on the drum 1 and developed by the developer fed from the developing roller 3 to turn out a toner image. The toner image is transferred to a paper or similar recording medium not shown. The toner image on the paper is fixed by heat and pressure at a fixing device, not shown, and then the paper is driven out of the image forming apparatus.

The developing roller 3 is a magnetic roller including a magnet having a plurality of stationary magnetic poles, a cylindrical nonmagnetic sleeve surrounding the magnet, and end members mounted on axially opposite ends of the sleeve. The end members are implemented as a drive flange for causing the sleeve to rotate, and a driven flange for holding the magnet within the sleeve. Basically, the developing roller 3 has the same configuration as the conventional magnet roller 50 shown in FIG. 1.

The configuration of the developing roller 3 will be described specifically with reference to FIG. 1. As shown, in the developing roller, the core 51 protrudes from one axial end of the magnet 52. The driven flange or end member 55 is rotatably mounted on the protruding end of the core 51 via a bearing 56. Specifically, the core 51 extends through a center hole formed in the driven flange 55 which is also substantially cylindrical. One axial end of the sleeve 53 is affixed to the circumferential surface of the driven flange 55, as will be described specifically later.

The other end of the core 51 is rotatably supported by the center portion of the drive flange 54 via a bearing 57. The drive flange 54 is also substantially cylindrical. The other axial end of the sleeve 53 is affixed to the circumferential surface of the drive flange 54, as will be described specifically later. The driven flange 55 and drive flange 54 each is positioned inward of the adjoining end of the sleeve 53 and firmly affixed thereto.

In the above configuration, the driven flange 55 and drive flange 54 are rotatable about and relative to the axis of the magnet 52. That is, the sleeve 53 and flanges 55 and 54 constructed integrally with each other are rotatable relative to the magnet 52 via the bearings 56 and 57 and core 51. The core 51, magnet 52, flanges 55 and 54 and sleeve 54 are concentric with each other and extend in the axial direction, constituting the developing roller 3. In FIG. 1, the reference numeral 58 designates a G seal.

Figure 2:
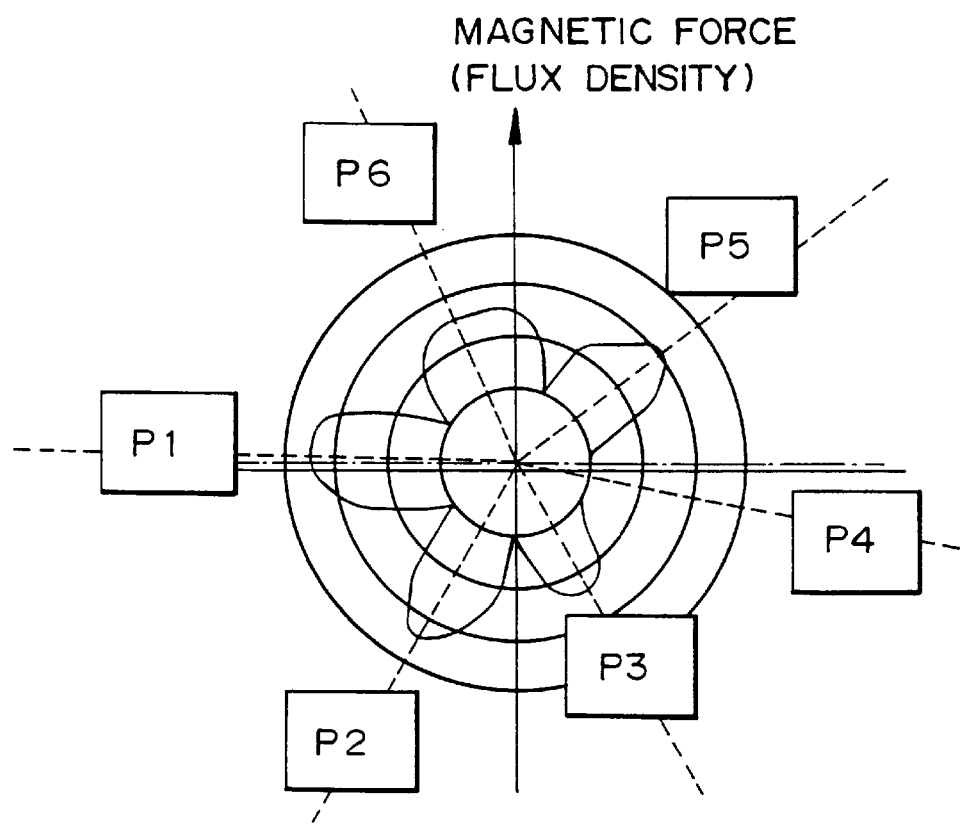
FIG. 2 shows the magnetic characteristic (flux density) of the magnet roller shown in FIG. 1.

As shown in FIG. 1, the drive flange 54 includes a rod-like stub 54a protruding outward concentrically with the core 51.

One end of the core 51 on which the magnet 52 is affixed is affixed to one side wall of the casing 2, FIG. 6, in the direction perpendicular to the sheet surface of FIG. 6. The stub 54a is rotatably supported by the other side wall in the above direction via a bearing, not shown. The rotation of a motor, not shown, mounted on the apparatus body is transmitted to the shaft 54a. As a result, the sleeve 53 and flanges 55 and 54 are rotated about the axis of the core 51 relative to the core 51. The developer is deposited on the surface of the sleeve 53 and conveyed by the sleeve 53 in order to develop a latent image formed on the drum 1, as stated earlier. Of course, the two-ingredient type developer may be replaced with a single-ingredient type developer, i.e., toner.

Alternatively, the sleeve 53 and flanges 55 and 54 may be affixed to the casing 2, and the core 51 may be rotatably supported by the casing 2. In such a case, the core 51 and magnet 52 will be rotated by a motor not shown. Further, an arrangement may be made such that the sleeve 53 and magnet 52 are rotated in opposite directions to each other.

The drive flange 54 for transmitting rotation to the sleeve 53 is often for med of highly wear-resistant nonmagnetic material, e.g., aluminum. The driven flange 55 for holding the magnet 52 within the sleeve 53 is often implemented by a resin molding for a light weight, inexpensive configuration. Because a bias voltage is generally applied to the sleeve 53 via the drive flange 54, the sleeve 53 and flange 54 are formed of a conductive material.

The prerequisite with the developing roller 3 is that the sleeve 53 and two flanges 55 and 54 be firmly affixed to each other so as not to be separated by, e.g., an extraneous force during operation. Specifically, it is necessary to prevent the sleeve 53 and at least one of the sleeves 55 and 54 from rotating relative to each other and to prevent the flanges 55 and 54 from slipping out of the sleeve 53.

More specifically, assume a resisting torque causing the sleeve 53 and flanges 55 and 54 to rotate relative to each other when they are disconnected by an extraneous force, and a pull strength causing the flanges 55 and 54 from slipping out of the sleeve 53 in the axial direction. Then, it is necessary to firmly affix the sleeve and flanges 55 and 54 in such a manner as to increase the resisting torque and pull strength.

Particularly, a heavy torque acts on the drive flange 54 which transmits rotation to the sleeve 53, as stated previously. Therefore, the drive flange 54 and sleeve 53 should be provided with a particularly great resisting torque and a particularly great pull strength. The driven flange 55 should also be firmly affixed to the sleeve 53 so as not to slip out of the sleeve 54 in the axial direction.

In light of the above, the developing roller 3 is implemented by a magnet roller produced by a unique method insuring the firm connection of the flanges 54 and 55 to the sleeve 53. A specific method of producing such a magnet roller will be described hereinafter. Briefly, each flange 54 or 55 includes a tapered portion tapered toward the adjoining axial end of the cylindrical structural body. The sleeve 53 has its axial end plastically deformed over the entire circumference such that the inner periphery of the end closely contacts the tapered portion of the flange 54 or 55. Specifically, the cylindrical flanges 54 and 55 each has a concentric frustoconical inclined surface at its one end. The end of the sleeve 53 adjoining the flange 54 or 55 is pressed such that it closely contacts the above inclined surface of the flange 54 or 55. As a result, the flange 54 or 55 is affixed to the sleeve 53. While the following procedure concentrates on the drive flange 54, it is, of course, applicable to the driven flange 55.

Figure 8A:
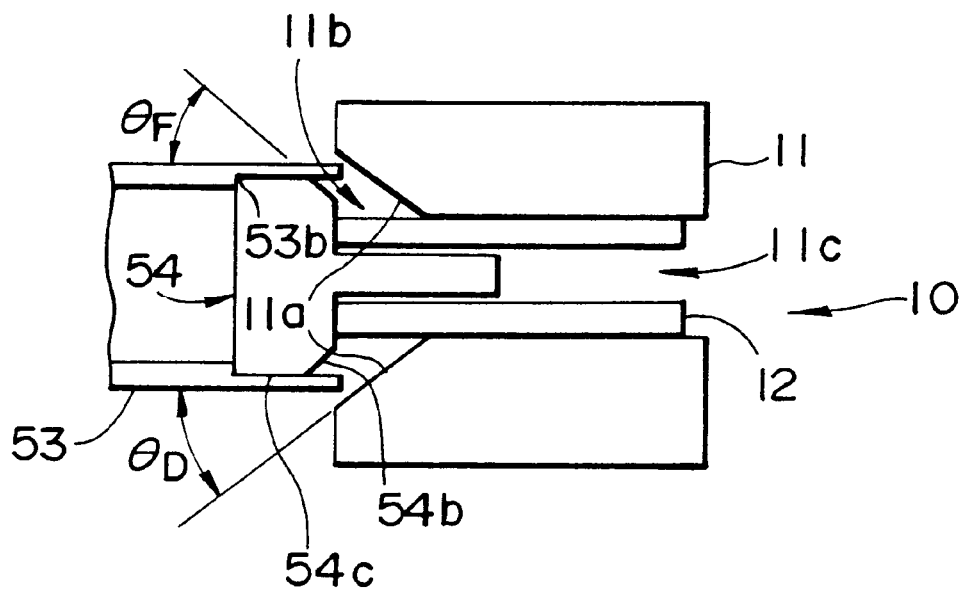
FIGS. 8A and 8B show a pressing device used to affix flanges included in the developing roller of the developing device to a sleeve.
Figure 8B:
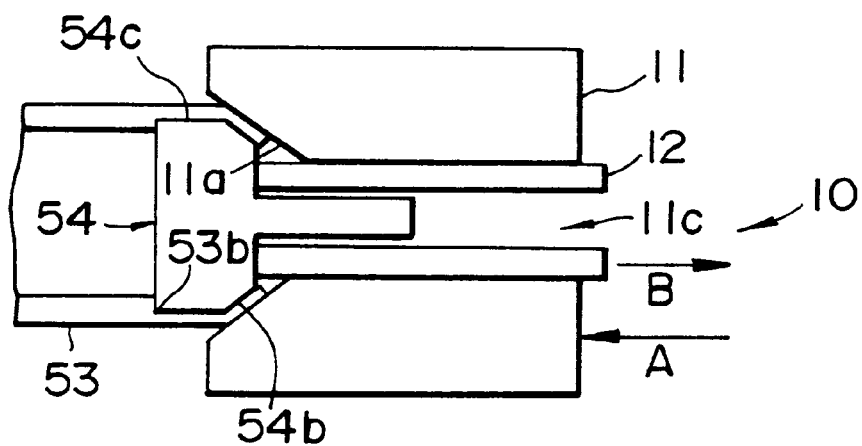

FIGS. 8A and 8B show a pressing device 10 for affixing the drive flange 54 to the sleeve 53. As shown, the pressing device 10 is made up of a die 11 formed with a conical bore 11b, and a knock-out member 12 slidably received in a center hole 11c contiguous with the bore 11b.

The sleeve 53 has a uniform outside diameter and has a uniform wall thickness at its opposite end portions. The inside diameter of the sleeve 53 is greater at each end portion than at the intermediate portion, so that a shoulder 53b is formed. The drive flange 54 is positioned relative to the sleeve 53 by the shoulder 53b. The drive flange 54 has one end which is frustoconical, a cylindrical intermediate portion, and the other end which is flat and extends perpendicular to the center line of the core 51. The outside diameter of the drive flange 54 is smaller than the inside diameter of the end of the sleeve 53. Therefore, when the drive flange 54 is inserted into the sleeve 53, a small annular gap (not causing sliding movement or play to occur) is formed between the drive flange 54 and the inner periphery of the sleeve 53.

Specifically, as shown in FIG. 8A, the drive flange 54 is inserted into the sleeve 53 until the end of the flange 54 abuts against the shoulder 53b of the sleeve 53. Then, as shown in FIG. 8B, the die 11 is moved toward the sleeve 53, as indicated by an arrow A, with the result that the conical bore 11b of the die 11 causes the end of the sleeve 53 to plastically deform and contact the frustoconical inclined surface 54b of the drive flange 54. At this instant, the knock-out member 12 is pressed by the circumferential surface 54c of the drive flange 54 and retracted in a direction indicated by an arrow B against the action of a spring not shown.

In the above condition, even when an extraneous force tending to cause the drive flange 54 to axially slip out of the sleeve 53 acts on the flange 54, the connection of the inclined surface 54b and deformed portion of the sleeve 53 is firm enough to prevent the flange 54 from slipping out. That is, a great pull strength is insured. Likewise, even when a heavy torque acts on the developing roller 3, the inclined surface 54b and deformed portion of the sleeve 53 are connected firmly enough to prevent the sleeve 53 and drive flange 54 from rotating relative to each other, insuring a great resisting torque.

The end of the sleeve 53 is plastically deformed to contact the drive flange 54 while the drive flange 54 is positioned by the shoulder 53b. The drive flange 54 can therefore be surely fixed in place at a preselected position within the sleeve 53, so that a play between the flange 54 and the sleeve 53 in the axial direction of the sleeve 53 is obviated.

Assume that the developing roller 3 is implemented by the sleeve 53 having the shoulders 53b at its opposite end portions, as stated above. Then, the end portions and the intermediate portion of the sleeve 53 should preferably be used as the non-image region and the image region, respectively. With this configuration, the developing roller 3 has its wall thickness and therefore strength increased in the developer depositing region.

The other end portion of the sleeve 53 is also plastically deformed in order to affix the drive flange 55. Usually, a pressing device capable of affixing the two flanges 54 and 55 to the sleeve 53 at the same time is used.

Assume that the affixing method described with reference to FIGS. 8A and 8B is applied to only one of the drive flange 54 and driven flange 55. Then, a jig for positioning the flange may be inserted into the sleeve 53 via the end opposite to the end to which the flange is to be affixed, so that the end portion of the sleeve 53 is plastically deformed to contact the flange with the flange being positioned by the jig. This makes it needless to form the shoulder 53b on the sleeve 53. Further, assume that the above affixing method is applied to both of the flanges 54 and 55, but does not affix them to the sleeve 53 at the same time. Then, the sleeve 53 may be formed with the shoulder 53b on its one end. In this case, one of the flanges 54 and 55 will be affixed to the end portion of the sleeve 53 void of the shoulder 53b by the jig, and then the other sleeve will be affixed to the end portion of the sleeve 53 having the shoulder 53b by being positioned by the shoulder 53b.

Figure 9:
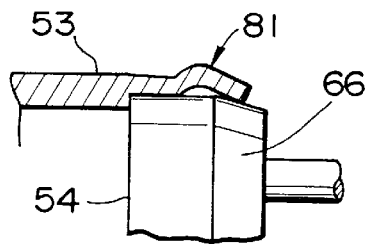
FIG. 9 is a section showing a projection formed in the sleeve.

When each end portion of the sleeve 53 is plastically deformed complementarily to the inclined surface 54b of the flange 54, as stated above, the bent end portion of the sleeve 53 bulges out radially outward due to the deformation, as determined by a series of experiments. FIG. 9 shows the resulting projection, labeled 81, in an exaggerated scale. The projection 81 brings about the following problems if noticeable.

Figure 10:
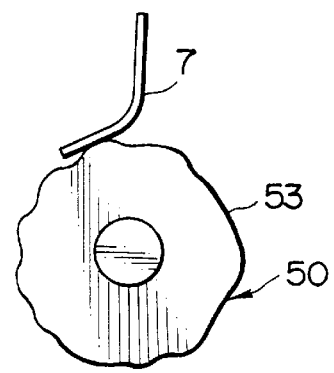
FIG. 10 shows a problem ascribable to the projection.

If the projection 81 is greater than a desired gap between the developing roller 3 and the drum 1, then the gap undesirably increases. Further, the projection 81 prevents the seal 7 contacting the end of the sleeve 53 including the projection 81 from closely contacting the sleeve 53, as shown in FIG. 10 in an exaggerated scale. As a result, the sealing function of the seal 7 is deteriorated. Moreover, the seal 7 repeatedly hits against the projection 81 and wears rapidly. In addition, even if the projection 81 is smaller than the desired gap between the developing roller 3 and the drum 1, the projection 81 is apt to make it difficult to maintain the desired gap. It is therefore necessary to make the projection 81 as small as possible.

As shown in FIGS. 8A and 8B, assume that the conical bore 11b of the die 11 has an inclined surface 11 inclined by an angle $\theta_D$ relative to the axis of the developing roller 3, and that the inclined surface 54b of the flange 54 has an angle $\theta_F$. Extended studies and experiments showed that the above projection is likely to increase in size when the two angels $\theta_D$ and $\theta_F$ are equal to each other. This is presumably because when the end portion of the sleeve 53 is plastically deformed, it closely contacts both the inclined surface 11a of the bore 11b and the inclined surface 54b of the flange 54, and the resulting strain cannot be sufficiently absorbed between the two inclined surfaces.

It is therefore preferable that the angle $\theta_D$ of the die 11 be different from the angle $\theta_F$ of the flange 54. Then, the strain ascribable to the deformation is confined in the portion where the distance between the two inclined surfaces 11a and 54b is comparatively great. Consequently, the projection of the sleeve 53 appearing in the vicinity of the inclined surface 54b can be reduced in size.

Figure 11:
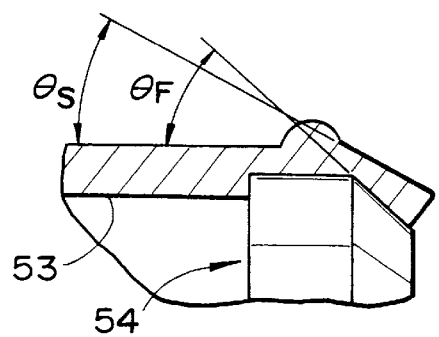
FIG. 11 shows the sleeve and one of the flanges included in the developing roller.

As shown in FIG. 11, when the angle $\theta_D$ of the die 11 and the angle $\theta_F$ of the flange 54 are different from each other, the outer periphery of the portion of the sleeve 53 contacting the inclined surface 54b of the flange 54 is inclined by an angle $\theta_S$ equal to the angle $\theta_D$. That is, the angle $\theta_S$ differs from the angle $\theta_F$, meaning that the wall thickness of the end of the sleeve 53 varies in the axial direction of the sleeve 53. As shown in FIG. 11, the wall thickness should preferably sequentially increase toward the end of the developing roller 3 in the axial direction. This can be done if the angle $\theta_S$ is made smaller than the angle $\theta_F$. With this configuration, it is possible to affix the sleeve 53 more firmly to the flange 54 at the end portion of the developing roller 3, and therefore to further enhance the pull strength and resisting torque.

Figure 12:
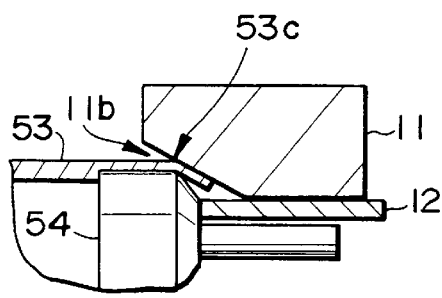
FIG. 12 shows the end portion of the sleeve included in the developing roller.

Assume that the angle $\theta_D$ of the die 11 is smaller than the angle $\theta_F$ of the flange 54. Then, as shown in FIG. 12, when the end portion of the sleeve 53 is plastically deformed by the inclined surface 11a of the die 11, a high surface pressure acts on the the portion 53c of the sleeve 53 sandwiched between the end portion of the frustoconical portion of the flange 54 close to the center in the axial direction and the bore 11b. As a result, the end portion of the sleeve 53 bites more intensely into the flange 54 and thereby enhances the resisting torque.

Further, when the angle $\theta_D$ is smaller than the angle $\theta_F$, the portion where the gap between the inclined surfaces 11a and 54b is comparatively great is positioned at the end of the portion of the sleeve 53 surrounding the inclined surface 54b. At this position, opposite to the position where the projection occurs, the strain ascribable to the plastic deformation is absorbed. The strain therefore has a minimum of influence on the shape of the projection. In this sense, too, the angle $\theta_D$ should preferably be smaller than the angle $\theta_F$.

Figure 13:
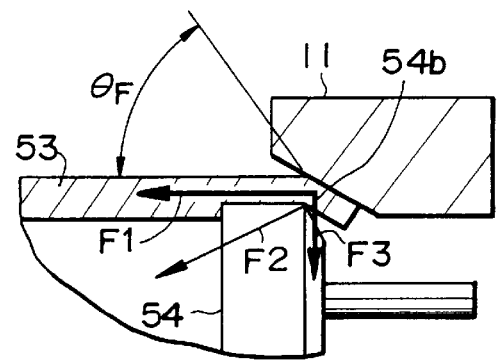
FIG. 13 shows forces acting on the end portion of the sleeve.

As shown in FIG. 13, due to a force $F_1$ causing the end portion of the sleeve 53 to plastically deform, a force $F_2$ acts in the axial direction of the sleeve 53. The force $F_2$ increases with an increase in the angle $\theta_F$ of the flange 54. Should the force $F_2$ increase to an excessive degree, a stain would occur in the sleeve 53 and vary the outside diameter of the sleeve 53. The angle $\theta_F$ should therefore be so selected as to cause the outside diameter of the sleeve 53 to change little. In FIG. 13, labeled $F_3$ is a force derived from the force $F_1$ and pressing the sleeve 53 against the flange 54. The knock-out member 12 is not shown in FIG. 13.

If the inside of portion of the sleeve 53 where the projection occurs is hollow, then it is likely that such a portion of the sleeve 53 itself bends or that the projection occurs unevenly in the circumferential direction of the sleeve 53. As a result, the outside diameter of the sleeve 53 becomes irregular and makes it difficult to maintain the developing gap constant. Further, when the seal 7 is held in close contact with the projection, the sealing ability of the seal 7 is apt to become unstable.

To solve the above problems, in the illustrative embodiment, the portion of the drive flange 54 other than the frustoconical end portion, i.e., the portion closer to the axial center of the developing roller 3 than the end portion is provided with a cylindrical configuration. The circumferential surface of the cylindrical portion 54c contacts, or supports, the inner periphery of the sleeve 53. It follows that when the strain is confined in the portion of the sleeve 53 supported by the cylindrical portion 54c, it is prevented from causing the sleeve 53 from bending or from rendering the projection uneven in the circumferential direction of the sleeve 53. The projection ascribable to the strain is evenly or continuously formed at the same position in the axial direction, i.e., a position adjoining the portion of the sleeve 53 surrounding the frustoconical portion of the flange 54 over the entire circumference of the portion of the sleeve 53 surrounding the cylindrical portion 54c of the flange 54. This renders the developing gap stable and insures stable sealing.

Moreover, when the developing roller 3 is mounted to a developing device, the continuous projection extending over the entire circumference of the sleeve 53 successfully prevents the image region or developer depositing region of the roller 3 from contacting the other structural members adjoining the mounting portion of the developing device. The developing roller 3 can therefore be easily mounted to the developing device.

The projection should preferably be positioned outside of the developer depositing region of the developing roller 3. With this configuration, it is possible to prevent the projection from adversely influencing the operation of the developing roller 3, e.g., from reducing the developing gap and thereby rendering an image irregular.

The circumferential surface of the cylindrical portion 54c plays the role of a sleeve support surface contacting the inner periphery of the sleeve 53 and thereby insuring the accurate assembly of the sleeve 53 and drive flange 54. Specifically, the inner periphery of the sleeve 53 closely contacts the circumferential surface of the cylindrical portion 54c prior to the plastic deformation of the end portion of the sleeve 53, so that the drive flange 54 and sleeve 53 are maintained concentric with each other. Because the portion of the sleeve 53 contacting the circumferential surface of the cylindrical portion 54c is not pressed, the former is held in close contact with the latter even after the plastic deformation of the sleeve 53. Therefore, even after the plastic deformation of the sleeve 53, the sleeve 53 and drive flange 54 are maintained precisely concentric with each other. This is also true with the driven flange 55.

When the developing roller 3 is implemented by the magnet roller produced by the above procedure, the sleeve 53 is prevented from rotating with noticeable eccentricity or from noticeably oscillating. It follows that a toner image of high quality can be formed on the drum 1.

It is to be noted that the surface of each of the flanges 54 and 55 contacting the inner periphery of the sleeve 53 may be implemented as an inclined surface, as distinguished from the cylindrical surface parallel to the axis of the developing roller 3, in which case the inner periphery of the sleeve 53 will also be inclined.

Figure 14A:
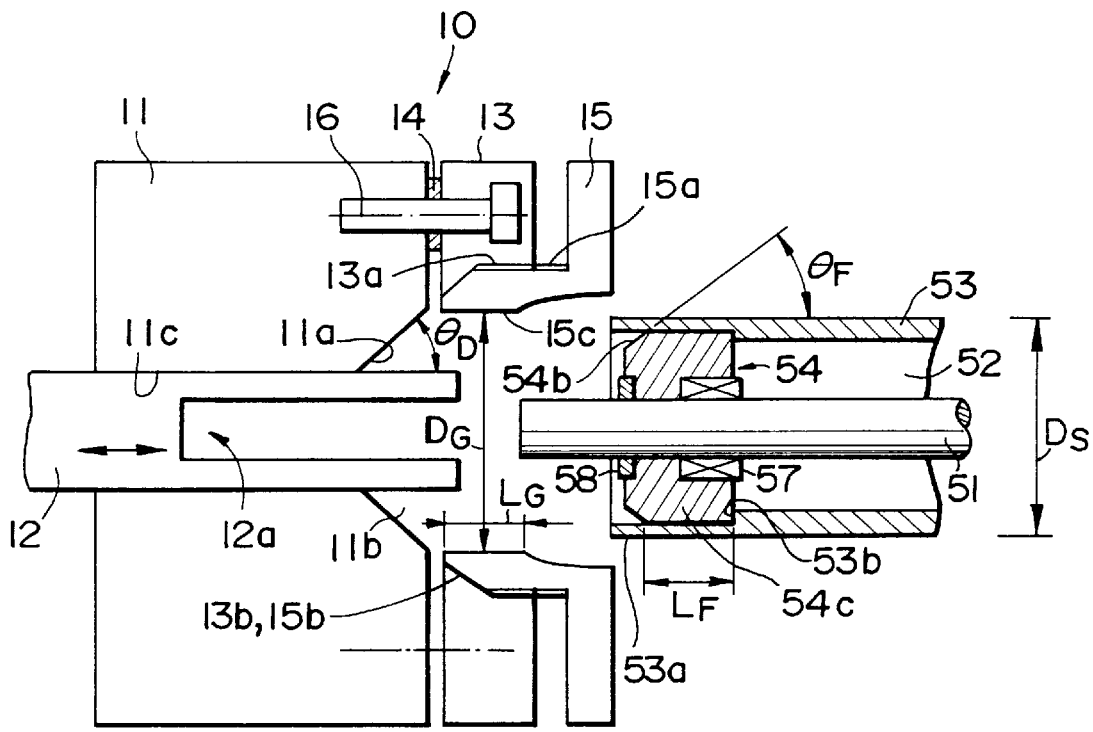
FIG. 14A is a vertical section showing a pressing device included in the illustrative embodiment and a magnet roller in a condition before a pressing operation.
Figure 14B:
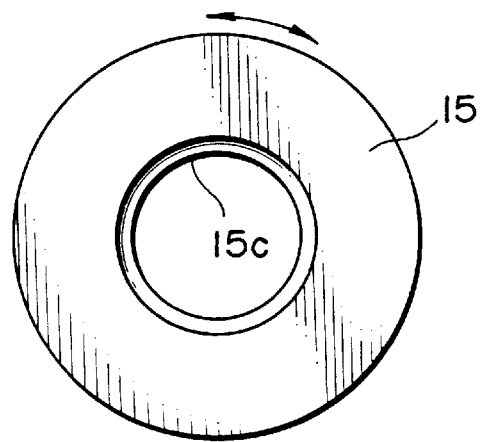
FIG. 14B is a side elevation of a guide included in the pressing device, as seen from the right.

The method of producing the magnet roller will be described more specifically hereinafter. In the method of producing the magnet roller consisting of the magnet, non-magnetic sleeve, drive flange, and driven flange, as stated previously, the drive flange and driven flange each is formed with the frustoconical inclined surface at its one end. Use is made of a pressing device including a die having a conical bore for pressing the sleeve. The conical bore has an inclined surface inclined by a smaller angle than the frustoconical inclined surface of the flange. First, the flange is inserted into the end portion of the sleeve such that its inclined surface is surrounded by the end portion of the sleeve. Then, the sleeve is inserted into the pressing device. While the portion of the outer periphery of the sleeve surrounding the cylindrical portion of the flange is held by the pressing device over its substantially entire surface, the portion of the sleeve surrounding the inclined surface of the flange is press-fitted in the conical bore of the die. As a result, the portion of the sleeve surrounding the inclined surface of the flange is pressed by the inclined surface of the bore. In this manner, the flange is affixed to the sleeve. Let this procedure be referred to as a mode A. FIGS. 14A and 14B show the mode A specifically. As shown, there are prepared the cylindrical flange 54 having a concentric, frustoconical inclined surface 51b at its one end, and the pressing device 10 including the conical bore 11b. The bore 11b has an inclined surface 11a whose angle of inclination $\theta_D$ is smaller than the angle of inclination $\theta_F$ of the inclined surface 54b of the flange 54.

First, the flange 54 is inserted into the end portion of the sleeve 53 such that its inclined surface 54b is surrounded by the end portion of the sleeve 53. Then, the sleeve 53 is inserted into the pressing device 10. While the portion of the outer periphery of the sleeve 53 surrounding the cylindrical portion 54c of the flange 54 is held by the pressing device 10 over its substantially entire surface, the portion 53a of the sleeve 53 surrounding the inclined surface 54b of the flange is press-fitted in the bore 11b of the die 11. As a result, the portion 53a of the sleeve 53 surrounding the inclined surface 54b of the flange 54 is pressed by the inclined surface 11a of the bore 11. In this manner, the flange 54 is affixed to the sleeve 53.

In the above mode A, the sleeve 53 is provided with a greater inside diameter at its end than at its intermediate portion so as to form the shoulder 53b. The end of the flange 54 opposite to the inclined surface 54b is abutted against the shoulder 53b of the sleeve 53 beforehand. Then, the above pressing operation is effected by pressing the end of the knock-out member 12 of the die 11 against the end of the flange 54. Let this procedure be referred to as a mode B. Further, in the modes A and B, after the pressing operation, the pressure of the pressing device 10 acting on the sleeve 53 is cancelled. Then, the end of the knock-out member 12 is caused to push the end of the flange 54 in order to remove the magnet roller from the die 11. Let this procedure be referred to as a mode C.

Figure 15A:
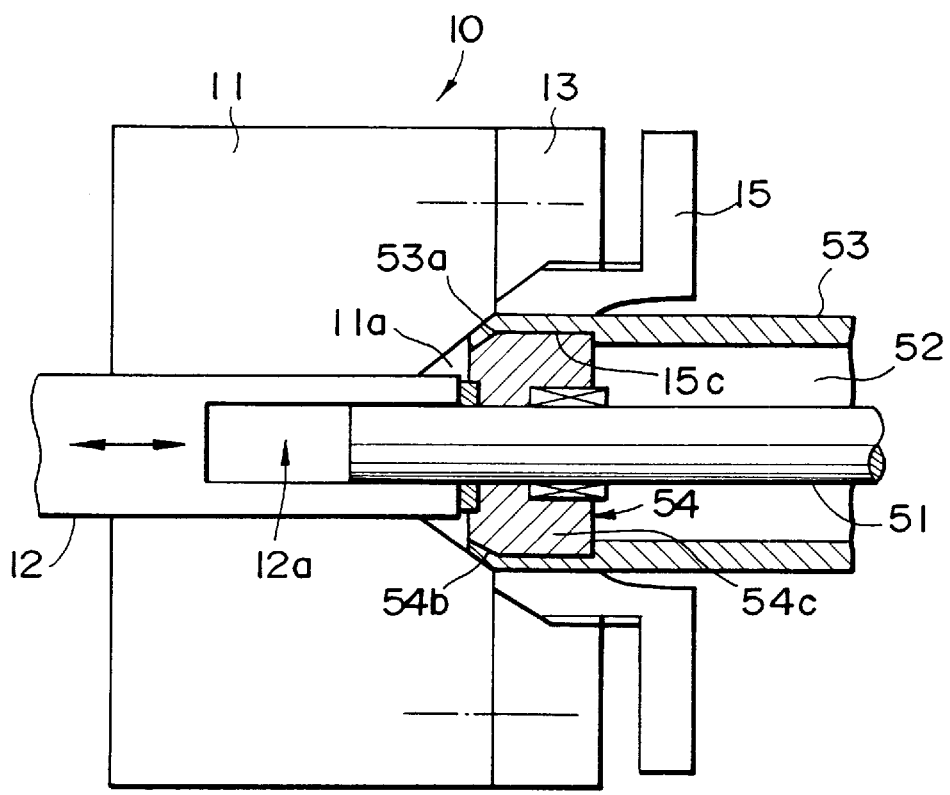
FIG. 15A is a view similar to FIG. 14A showing the pressing device and magnet roller in a condition after the pressing operation.
Figure 15B:
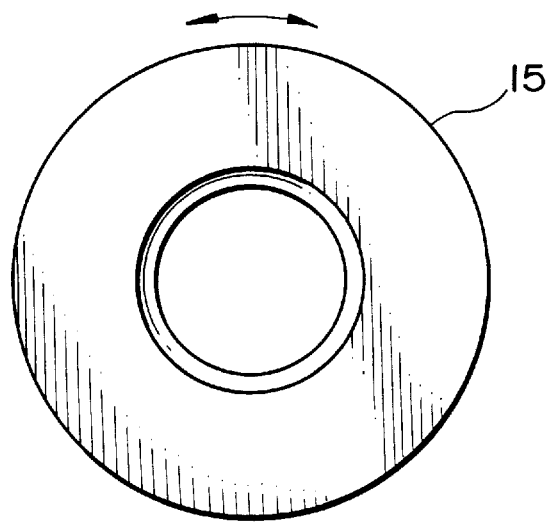
FIG. 15B is a view similar to FIG. 14B.

The pressing device 10 shown in FIGS. 14A and 14B and implementing the above mode C will be described more specifically hereinafter. FIGS. 15A and 15B show a condition just after the pressing operation effected by the pressing device 10. As shown in FIG. 14A, the pressing device 10 includes a guide holder 13 and a guide 15 in addition to the die 11 having the conical bore 11b, center hole 11c, knock-out member 11, and a presser, not shown, for pressing the knock-out member 12. The guide holder 13 is concentric with the bore 11b and adjoins the end of the die 11 with the intermediary of a coil spring 14. A screw-thread 13a is formed in the inner periphery of the guide holder 13. The guide holder 13 is movable toward and away from the die 11. The guide 15 has a collet chuck structure and held in threaded engagement with the guide holder 13 via the screw-thread 13a. One end of the guide 15 faces the bore 11b of the die 11. A hydraulic cylinder, not shown, operable with a preselected pressure causes the die 11 to move back and forth, as needed.

The knock-out member 12 is slidably received in the center hole 11c and constantly biased by a coil spring, not shown, at its rear end. A bore 12a is concentrically formed in the knock-out member 12 for allowing the core 51 of the magnet roller to be slidingly inserted thereinto. The angle $\theta_D$ of the inclined surface 11a of the bore 11b is selected to be 30° by way of example.

The guide holder 13 is an annular flat plate and formed with the screw-thread 13a in the inner periphery of its former half. The latter half of the guide holder 13 closer to the die 11 than the former half has a conical inner periphery or inclined surface 13b. This surface 13b is inclined by substantially the same angle $\theta_D$ as the inclined surface 11a of the die 11. A guide pin 16 is inserted in both of the die 11 and guide holder 13 in order to position the guide holder 13 relative to the die 11 and to guide it during movement. The coil spring 14 is wound round the guide pin 16 between the die 11 and the guide holder 13.

The guide or collet chuck 15 has a former half (left portion as viewed in FIG. 14A) having a conical outer periphery or inclined surface 15b. The inclined surface 15b is inclined by the same angle as the inclined surface 13b of the guide holder 13. The former half of the guide 15 has a cylindrical inner periphery 15c. A screw-thread 15a is formed in the outer periphery of the intermediate portion of the guide 15. The rear end portion of the guide 15 is implemented as a flat annular disk. The screw-thread 15a is engaged with the screw-thread 13a of the guide holder 13a. The guide holder 13 and guide 15 are positioned concentrically with the die 11.

As shown in FIGS. 14A and 14B, the magnet roller with the magnet 52 and sleeve 53, drive flange 54 and driven flange 55, not shown, are prepared. The sleeve 53 has a uniform outside diameter. The front end portion and rear end portion of the sleeve 53 for receiving the drive flange 54 and driven flange 55, respectively, each is provided with a greater inside diameter than the intermediate portion for thereby forming the shoulder 53b.

The drive flange 54 is frustoconical at one end portion, flat and perpendicular to the center line of the core 51 at the other end portion, and cylindrical at the intermediate portion. The drive flange 54 has a smaller inside diameter than the former half of the sleeve 53, so that the previously mentioned small gap is formed between the flange 54 and the inner periphery of the sleeve 53. The driven flange 55 is provided with the same configuration as the drive flange 54. There are also shown in FIGS. 14A and 14B the G seal 58 and a slide bearing or similar bearing 57.

The sleeve 53 has an outside diameter $D_S$ slightly smaller than the inside diameter $D_G$ of the guide 15 (diameter of the cylindrical inner periphery 15c). In this condition, when the sleeve 53 is inserted into the guide 15, the outer periphery of the sleeve 53 is prevented from sliding or shaking. For example, the inside diameter of the guide 15 and the outside diameter of the sleeve 53 are selected to be 16.03 mm and 15.99 mm, respectively. The cylindrical portion of the drive flange 54 has a length $L_F$ equal to the length $L_G$ of the cylindrical inner periphery 15c of the guide 15. Further, the angle $\theta_F$ of the inclined surface 54b of the drive flange 54 is greater than the angle $\theta_D$ of the inclined surface 11a of the die 11. For example, when the angle $\theta_D$ is 30°, the angle $\theta_F$ is selected to be 33°.

A procedure for affixing the drive flanges 54 and driven flange 55 to the sleeve 53 is as follows.

(1) The drive flange 54 is inserted into the sleeve 53 until its rear end or flat end abuts against the shoulder 53b. The driven flange 55 is inserted into the sleeve 53 in the same manner as the drive flange 54.

(2) The sleeve 53 is centered with respect to the die 11, as shown in FIG. 14A.

(3) The die 11 held in the position shown in FIG. 14A is moved toward the sleeve 53 integrally with the guide holder 13 and guide 15. At the same time, the sleeve 53 is moved toward the die 11 with the rear of the driven flange 55 pressed by a suitable device.

(4) The movement of the sleeve 53 is stopped, but the movement of the die 11 is continued until the end of the sleeve 53 abuts against the inclined surface 11a of the die 11.

At the same time, the end of the knock-out member 12 is brought into contact with the end of the drive flange 54. The drive flange 54 and the shoulder 2b of the sleeve 53 are held in contact with each other by the knock-out member 12. As soon as the contact pressure acting between the drive flange 54 and the shoulder 2b reaches the preselected pressure of the hydraulic cylinder, the movement of the die 11 is automatically stopped.

(5) The guide 15 is rotated by hand and driven into the guide holder 13 until the torque of the guide 15 rises to a preselected value. At this instant, the guide or collet chuck 15 moves toward the die 11 with its inclined surface 15b being guided by the inclined surface 13b of the guide holder 13. Because the inside diameter of the guide 15 sequentially decreases, the force of the guide 15 acting on substantially the entire outer periphery of the sleeve 53 sequentially increases. As a result, the portion 53a of the sleeve 53 surrounding the inclined surface 54b of the drive flange 54 is pressed by the inclined surface 11a of the die 11. The resulting strain in the sleeve 53 causes the portion of the sleeve 53 adjoining the portion 53a to bulge out in the form of a projection, as stated previously. However, because the angle of the inclined surface 11a of the die 11 and that of the inclined surface 54b of the drive flange 54 are different from each other, the above projection is relatively small. Even when the protection tends to increase in size, it is limited in height by the guide 15 and sleeve 53. The projection therefore does not increase in size to such a degree that the desired developing gap cannot be maintained. As shown in FIG. 15A, after the pressing operation, the cylindrical portion 54c of the drive flange 54 and the cylindrical inner periphery 15c of the guide 15 coincide with each other. This allows substantially the entire portion 53a of the sleeve 53 to be evenly pressed by the guide 15, so that the sleeve 53 is free from irregularity in outside diameter ascribable to the pressing operation.

(6) The guide 15 is rotated in the opposite direction by hand in order to release the guide 15 from the sleeve 53. Then, the die 11 is retracted away from the sleeve 53. Because the knock-out member 12 constantly presses the end of the drive flange 54 during pressing operation, the magnet roller is easily separated from the guide 15 after the pressing operation.

As stated above, with the above pressing device, it is possible to achieve a more desirable affixing effect than with the conventional affixing methods or devices by using a simple procedure not needing lugs customarily formed on the end of a sleeve. Specifically, the following advantages are achievable with the pressing device.

(1) Each flange can be firmly and evenly affixed to the sleeve.

(2) The projection does not easily increase in size. Also, the flange is inserted into the sleeve while being spaced from the sleeve by a suitable gap (the former is not press-fitted in the latter), and then the pressing operation is effected. This prevents the sleeve from deforming or having its inner periphery scratched.

(3) The axis of the flange and that of the sleeve are substantially free from deviation.

(4) The flange is fixed in place at a preselected position in the axial direction of the sleeve.

(5) The outer periphery of the sleeve is free from scratches ascribable to contact between the inner periphery of the guide and the outer periphery of the sleeve.

(6) The sleeve is free from noticeable irregularity in diameter ascribable to the pressing operation.

It is to be noted that the manual operation for affixing the flanges 54 and 55 to the sleeve 53 may be replaced by an automatic device.

The resisting torque characteristic of the developing roller 3 produced by the above method and the irregularity in the outside diameter of the sleeve were estimated, as follows. The angle $\theta_D$ of the die 11 was selected to be 30° while the angle $\theta_F$ of the drive flange 54 was varied as 31°, 32°, 33° and 45°. The drive flange and driven flange were affixed to the sleeve by the above procedure in order to produce the magnet roller.

Figure 16:
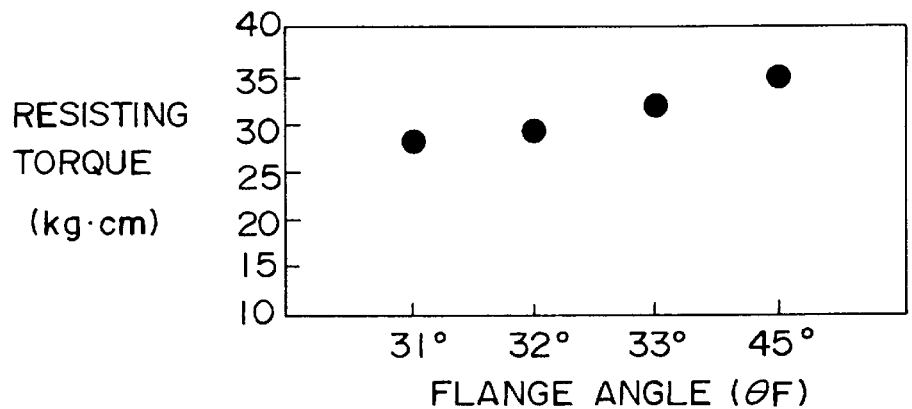
FIG. 16 is a graph showing a relation between the inclination angle θF of the flange and the resisting torque of the magnet roller available after the pressing operation.
Figure 17:
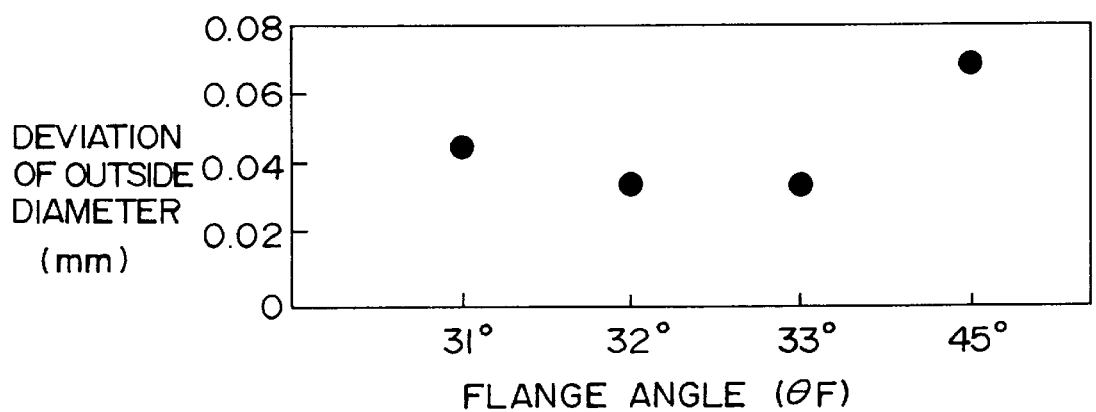
FIG. 17 is a graph showing a relation between the inclination angle θF of the flange and the deviation of outside diameter of the magnet roller available after the pressing operation.

As for the resisting torque characteristic, while the intermediate portion of the sleeve in the axial direction was affixed by a jig, a torque was applied to the drive flange so as to measure, with a torque gauge, a torque caused the flange to start rotating (idling) relative to the sleeve. As for the irregularity in the outside diameter of the sleeve, the outside diameter of the sleeve was measured by a dial gauge, and the greatest difference between the greatest outside diameter and the diameter of the intermediate portion was determined to be a deviation. FIGS. 16 and 17 respectively plot the measured resisting torques and the measured deviations of outside diameter.

It was experimentally determined that when the inclined portion of the flange has an angel equal to or smaller than the angle of inclination of the die, the pressing effect is insufficient around the boundary between the inclined surface and cylindrical portion of the flange, preventing the resisting torque from being enhanced to a satisfactory degree.

The above results of measurement indicate the following.

(1) The resisting torque increases with an increase in the angle $\theta_F$ of the flange.

(2) The deviation of outside diameter is substantially minimum when the angle $\theta_F$ is 33° when lying in the range of from 31° to 45°.

(3) It follows that the optimal value of the angle $\theta_F$ capable of increasing the resisting torque and reducing the deviation of outside diameter is substantially 33°. That is, when the die has the angle $\theta_D$ of 30°, the angle $\theta_F$ of the flange should be substantially 33°.

(4) When the angle $\theta_F$ was 33°, the resisting torque and the deviation of outside diameter were 32 kg.cm and about 0.03 mm, respectively.

For comparison, a magnet roller was produced under the same conditions as in the above embodiment except that the conventional method of FIG. 4 was used. Such a magnet roller was found to have a resisting torque between 18 kg.cm and 20 kg.cm and a deviation of outside diameter between about 0.05 mm and about 0.06 mm.

The seal members 7 included in the developing device shown in FIG. 6 will be described more specifically. The seal members 7 each intervenes between one non-image area of the developing roller and the portion of the casing 2 facing the non-image area. In the developing device shown in FIG. 6, the seal members 7 respectively contact the portions of the sleeve 53 surrounding the cylindrical portions of the flanges 54 and 55 as well as the portions of the sleeve 53 surrounding the tapered or frustoconical portions of the flanges 54 and 55. The portion of each seal member 7 contacting the portion of the sleeve 53 surrounding the cylindrical portion of the flange 54 or 55 is provide with a higher compressibility than the portion of the sleeve 7 contacting the portion of the sleeve surrounding the frustoconical portion of the flange 54 or 55. As a result, the compression set occurring in the portion of the seal member 7 contacting the portion of the sleeve 53 surrounding the cylindrical portion of the sleeve 54 or 55 is released at the portion of the sleeve 53 surrounding the frustoconical portion of the flange 54 or 55. This prevents the compression set of the seal member 7 from occurring in the portion of the sleeve 53 surrounding the cylindrical portion of the flange 54 or 55 toward the axial center of the developing roller 3. The developer can therefore be desirably deposited on the developing roller 3.

The sealing ability of the seal members 7 are more enhanced as they are more strongly pressed against the developing roller 3 over a greater area. However, if the portions of the developing roller 3 contacting the seal members 7 are flat, and if the contact pressure acting between the roller 3 and the sponge is low, then the roller 3 and sponge make line-to-line contact and have the sealing ability deteriorated. As a result, the developer is apt to enter the sliding portion between the core 51 or stub 54a of the developing roller 3 and the holder, obstructing the smooth rotation of the sleeve 53. On the other hand, if the above contact pressure is high, then the rotation torque of the sleeve 53 and therefore the load on the motor is increased although the contact area increases to enhance sealing.

Figure 18:
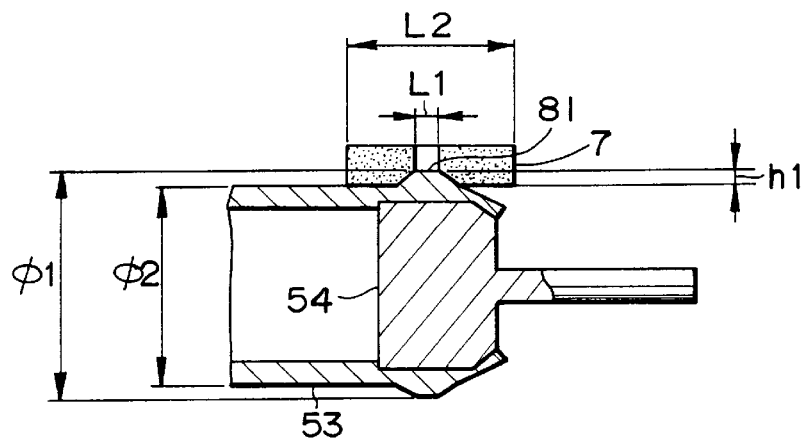
FIG. 18 shows the position of the seal member.

As shown in FIG. 18, in the illustrative embodiment, each seal member 7 contacts the portion of the sleeve 53 surrounding the cylindrical portion 54c of the drive flange 54 as well as the portion of the sleeve 53 surrounding the tapered or frustoconical portion of the flange 54, as stated earlier. Therefore, the projection 81 adjoining the portion of the sleeve 53 surrounding the inclined surface 54b of the flange 54 or 55 bites into the seal member 7. This is also true with the other seal member 7 associated with the driven flange 55. It follows that the portion of each flange 7 contacting the projection 81 is compressed more than the other portion due to the height of the projection 81.

The length $L_2$ of each seal member 7 in the axial direction of the developing roller 3 is greater than the length $L_1$ of the projection 81, so that the seal member 7 can cover the deforming range ascribable to the projection 81.

In the region where each seal member 7 contacts the developing roller 3, both ends of the seal member 7 contact the portions of the sleeve 53 other than the projection 81. In this condition, the compressibility of the seal member 7 is locally increased in the portion contacting the end of the projection 81. This portion of the seal member is therefore compressed more strongly against the sleeve 53 than the other portion, enhancing the sealing ability. Moreover, the frictional force acting between the seal member 7 and the developing roller 3 is less intense than when the compressibility of the seal member 7 is increased over its entire sealing region, and therefore sparingly obstructs the drive of the roller 3 and exerts a minimum of load on the motor. In addition, the durability of the seal member 7 is increased.

The projection 81 of the developing roller 3 is continuous over the entire circumference of the portion of the sleeve 53 surrounding the end member. With this kind of developing roller 3, stabling sealing is achievable.

When the angle $\theta_D$ of the inclined surface 11a of the die 11 and the angle $\theta_F$ of the inclined surface 54b of the drive flange 54 were different from each other, the outside diameter $\phi_1$ of the bulged portion of the developing roller 3 and the outside diameter $\phi_2$ of the image region of the roller 3 were different from each other by more than 0.02 mm inclusive, but less than 0.10 mm inclusive. Specifically, the height $h_1$ of the projection 81 was above 0.01 mm inclusive, but below 0.05 mm inclusive. When the projection 81 of the developing roller 3 was so positioned as to bite into the seal member 7, desirable sealing against the developer was attained, and the seal member 7 did not wear. For the seal member 7, use was made of sponge.

Figure 19:
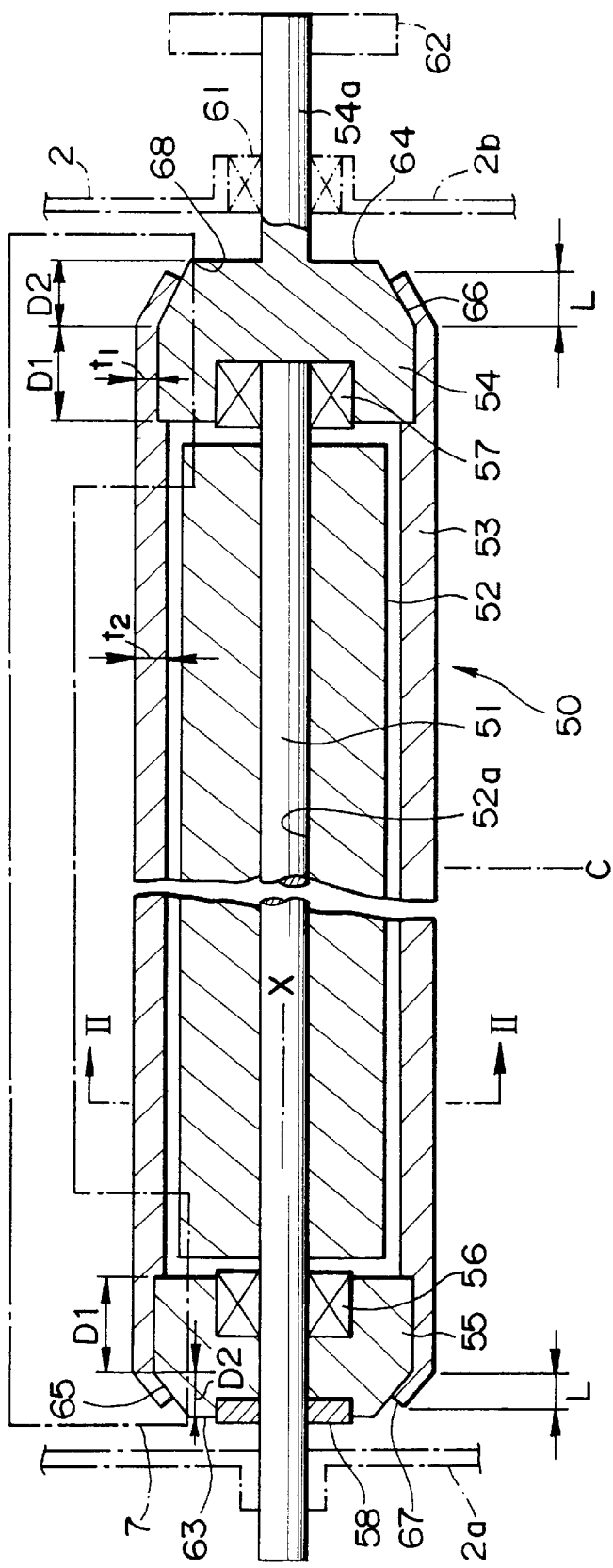
FIG. 19 is a partly taken away section showing a magnet roller representative of an alternative embodiment of the present invention.
Figure 20:
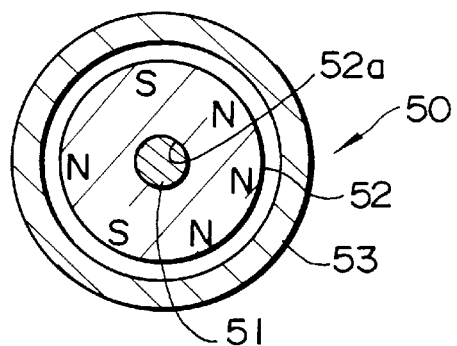
FIG. 20 is a section along line II—II of FIG. 19.
Figure 21:
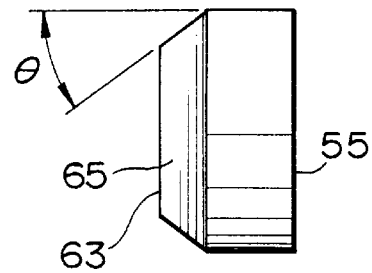
FIG. 21 shows the configuration of one end member.
Figure 22:
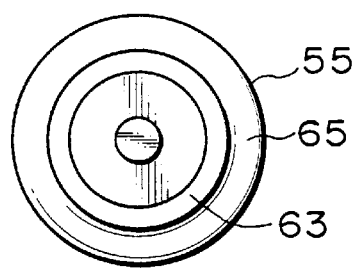
FIG. 22 is a view of the end member of FIG. 21, as seen from the left.
Figure 23:
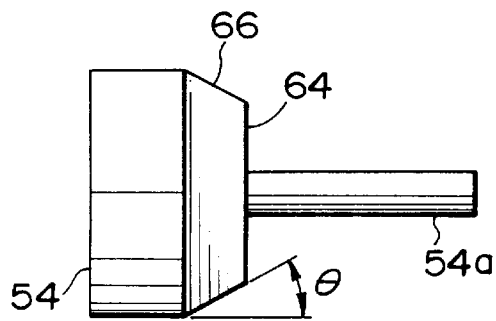
FIG. 23 shows the configuration of the other end member.
Figure 24:
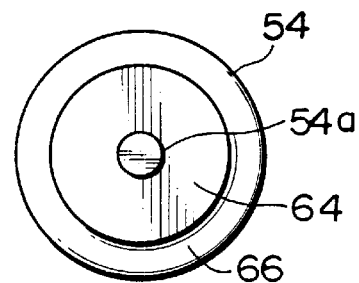
FIG. 24 is a view of the end member of FIG. 23, as seen from the right.

Referring to FIG. 19, an alternative embodiment of the present invention is shown and implemented as a magnet roller. FIG. 20 is a section along line II—II of FIG. 19. As shown, the magnet roller 50 also includes the hollow cylindrical sleeve 53 formed of aluminum or similar nonmagnetic material, magnet 52 disposed in the sleeve 53, and end members or flanges 54 and 55 respectively fitted in the opposite end portions of the sleeve 53.

In the illustrative embodiment, the rod-like metallic core 51 is received in a center bore 52a formed in the cylindrical magnet 52. A plurality of magnetic poles S and N are formed on the magnet 52 at circumferentially spaced locations, as shown in FIG. 20 specifically. The magnet 52 is a plastic magnet or a rubber magnet while the core 51 is formed of metal or similar highly strong material. If desired, the magnet 52 and core 51 may be formed of a magnet material integrally with each other.

The entire magnet 52 is disposed in the sleeve 53. The driven flange or end member 55 is mounted, via a bearing 56, on one end of the core 51 protruding outward in the axial direction of the magnet 52 and rotatable relative to the core 51. The driven flange 55 is also substantially cylindrical. The core 51 is extends throughout a center hole formed in the driven flange 55. One axial end of the sleeve 53 is affixed to the circumferential surface of the driven flange 55, as will be described specifically later.

The drive flange or end member 54 is mounted, via a bearing 57, on the other end of the core 51 protruding outward in the axial direction of the magnet 52 and rotatable relative to the core 51. The drive flange 54 is also substantially cylindrical. The core 51 is extends throughout a center hole formed in the drive flange 54. The other axial end of the sleeve 53 is affixed to the circumferential surface of the drive flange 54, as will be described specifically later. The flanges 54 and 55 are respectively positioned inward of the opposite axial ends of the sleeve 53 and firmly affixed thereto.

In the above configuration, the drive flange 54 and driven flange 55 are rotatable about and relative to the axis of the magnet 52. That is, the sleeve 53 and flanges 54 and 55 constructed integrally with each other are rotatable relative to the magnet 52 via the bearings 56 and 57 and core 51. The core 51, magnet 52, flanges 54 and 55 and sleeve 54 are concentric with each other and extend in the axial direction, constituting the developing roller 3.

The drive flange 54 includes the rod-like stub 54a protruding outward concentrically with the core 51. The G seal 58 is formed of a soft material and fitted on the outer end of the driven flange 55 in order to prevent impurities and toner, which will be described, from penetrating into the sleeve 53.

The magnet roller 50 is mounted to, e.g., the developing device or the cleaning device of an image forming apparatus and used in the previously stated manner. In the illustrative embodiment, the magnet roller 50 is also assumed to implement a developing roller. As shown in FIG. 19, one end of the core 51 on which the magnet 52 is mounted is affixed to one side wall 2a of the casing 2 of the developing device (indicated by phantom lines). The stub 54a is rotatably supported by the other side wall 2b (indicated by a phantom line) via a bearing 61. A gear 62 is mounted on the stub 54a and held in mesh with a gear, not shown, mounted on the apparatus body. The rotation of a motor, not shown, is transferred to the sleeve 53 and flanges 54 and 55 via the intermeshing gears, causing them to rotate about the axis of the core 51. At this instant, the two-ingredient type developer is deposited on the sleeve 53 due to the magnetic force of the magnet 52 and conveyed by the sleeve 53. The developer develops a latent image electrostatically formed on an image carrier, not shown. Of course, the two-ingredient type developer may be replaced with the previously mentioned single-ingredient type developer or toner.

If desired, the sleeve 53 and flanges 54 and 55 may be affixed to the casing 2, and the core 51 may be rotatably supported by the casing 2. In such a case, the core 51 and magnet 52 will be rotated by a motor via gears, not shown, or the sleeve 53 and magnet 52 may be rotated in opposite directions to each other.

The drive flange 54 for transmitting rotation to the sleeve 53 is often formed of highly wear-resistant nonmagnetic material, e.g., aluminum. The driven flange 55 for holding the magnet 52 within the sleeve 53 is often implemented by a resin molding for a light weight, inexpensive configuration. Because a bias voltage is generally applied to the sleeve 53 via the drive flange 54, the sleeve 53 and flange 54 are formed of a conductive material.

As for configuration, the above magnet roller is identical with the conventional magnet roller. The prerequisite with the developing roller 3 is that the sleeve 53 and two flanges 54 and 55 be firmly affixed to each other so as not to be separated by, e.g., an extraneous force during operation. Specifically, it is necessary to prevent the sleeve 53 and flanges 54 and 55 from rotating relative to each other and to prevent the flanges 54 and 55 from slipping out of the sleeve 53. That is, the sleeve 53 and flanges 54 and 55 must be firmly affixed to each other in such a manner as to increase both the resisting torque and pull strength, as stated earlier.

Particularly, a heavy torque acts on the drive flange 54 which transmits rotation to the sleeve 53, as stated previously. Therefore, the drive flange 54 and sleeve 53 should be provided with a particularly great resisting torque and a particularly great pull strength. The driven flange 55 should also be firmly affixed to the sleeve 53 so as not to slip out of the sleeve 54 in the axial direction.

In light of the above, as shown in FIGS. 19 and 21–24, tapered surfaces 65 and 66 are respectively formed on the outer peripheries of the flanges 54 and 55, and each is tapered toward the outer end 63 or 64 of the associated flange in the axial direction of the magnet roller 50. Opposite end portions of the sleeve 53 in the axial direction of the magnet roller 50 are plastically deformed over the entire circumference so as to extend along the tapered surfaces 65 and 66. In this condition, the opposite ends of the sleeve 53 are respectively affixed to the flanges 54 and 55, as in the previous embodiment.

As shown in FIG. 19, assume that the magnet roller 50 has a center C in the axial direction X which bisects the roller 50. Then, each flange 54 or 55 has a portion $D_1$ close to the center C and a portion $D_2$ remote from the center C. The portion $D_1$ constitutes a sleeve support surface contacting the inner periphery of the sleeve 53 in order to insure the accurate assembly of the flange and sleeve 53. The portion $D_2$ constitutes the tapered portion 65 or 66 tapered toward the outer end 63 or 64 of the flange. In addition, the axially opposite ends 67 and 68 of the sleeve 53 are respectively positioned axially inward of the ends 63 and 64 of the flanges 54 and 55, i.e., close to the center C of the magnet roller.

The above configuration allows the sleeve 53 and flanges 54 and 55 to be affixed together with a great resisting torque and a great pull strength. Further, the opposite ends of the sleeve 53 are respectively plastically deformed along the tapered surfaces 65 and 66 over their entire circumference. Therefore, the ends of the sleeve 53 can be bent and affixed to the flanges 54 and 55 by, e.g., a simple pressing device.

Figure 25:
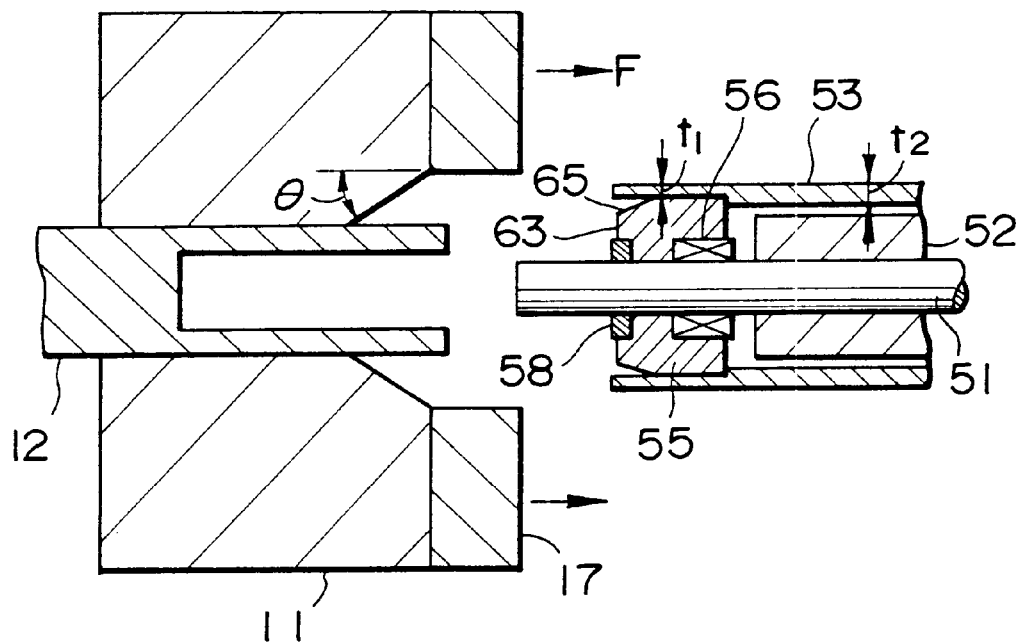
FIG. 25 is a section showing how the end portion of a sleeve is pressed by a pressing device and affixed to the end member.

FIG. 25 shows a specific construction of the above pressing device. As shown, the pressing device includes the die 11 and knock-out member 12 slidably received in the center hole of the die 11. A guide ring 17 is affixed to the end of the die 11. The conical bore with the inclined surface 11a is formed in the die 11. The inclined surface 11a is inclined by the same angle θ (see FIGS. 21 and 23) as the tapered surfaces 65 and 66 of the flanges 54 and 55.

Each end portion of the sleeve 53 has a wall thickness $t_1$ slightly smaller than the wall thickness $t_2$ of the intermediate portion of the sleeve 53. The flange 55 to which the magnet 52 and core 51 are mounted beforehand is lightly press-fitted in one end portion of the sleeve 53. At this instant, the flange 55 is positioned relative to the sleeve 53 by a shoulder intervening between the thin end portion and the thick intermediate portion of the sleeve 53.

After the sleeve 53 has been fixed in place, the die 11 is moved toward the sleeve 53 so as to cause the end portion of the sleeve 53 to plastically deform along the tapered surface 65 with its inclined surface 11a. At this instant, the knock-out member 12 is pressed by the outer end 63 of the flange 55 and retracted to the left, as viewed in FIG. 25, against the action of a spring, not shown.

The other end portion of the sleeve 53 is plastically deformed in exactly the same manner and affixed to the flange 54. Usually, use is made of a pressing device capable of affixing the two flanges 54 and 55 to the sleeve 53 at the same time.

In the above configuration, even when an extraneous force tending to cause the flanges 54 and 55 to slip out in the axial direction of the sleeve 53 acts on the flanges 54 and 55, the tapered surfaces 65 and 66 and the deformed end portions of the sleeve 53 firmly engage with each other and prevent the flanges 54 and 55 from slipping out. This guarantees a great pull strength. Likewise, when a heavy torque acts on the magnet roller 50, the flanges 54 and 55 and sleeve 53 are prevented from rotating relative to each other, i.e., a high resisting torque is achieved.

Further, the opposite ends of the sleeve 53 are respectively positioned closer to the center C of the magnet roller 50 than the outer ends 63 and 64 of the flanges 54 and 55, as stated earlier. Therefore, when the sleeve is plastically deformed by the pressing device shown in FIG. 25, the pressure acting on each end of the sleeve 53 and the associated tapered surface 65 or 66 increases for a unit area. Consequently, the sleeve 53 and flanges 54 and 55 are firmly affixed to each other, also enhancing the pull strength and resisting torque.

Figure 26:
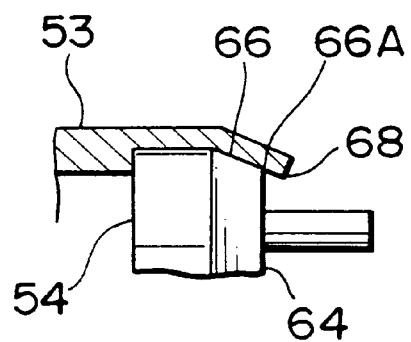
FIG. 26 is a section of the magnet roller in which the outer end of the sleeve protrudes outward over the outer end of the end member.

If desired, the ends 67 and 68 of the sleeve 53 may be respectively aligned with the outer ends 63 and 64 of the flanges 54 and 55 or may be protruded outward over the outer ends 63 and 64 of the flanges 54 and 55, as shown in FIG. 26. Such a configuration, however, brings about the following problem. When the sleeve 53 is plastically deformed by the pressing device, the pressure is apt to concentrate on the portion where the edge 66A of the tapered surface 66 and sleeve 53 are pressed against each other. As a result, the pressure acting on the entire tapered surface 66 and sleeve 53 for a unit area decreases and is apt to slightly deteriorate the strong connection between them. This is also true with the other tapered surface 65.

In the magnet roller 50 shown in FIG. 19, each end of the sleeve 53 is plastically deformed along the tapered surface 65 or 66 farther from the center C than the sleeve support surface $D_1$ of the flange 54 or 55. The sleeve support surface $D_1$ is therefore not bent. The inner periphery of the sleeve 53 contacts the sleeve support surfaces $D_1$ of the flanges 54 and 55 prior to the pressing of the sleeve 53, insuring the concentric arrangement of the flanges 54 and 55 and sleeve 53. Because the portions of the sleeve 53 contacting the sleeve support surfaces $D_1$ are not pressed, the close contact between the surfaces $D_1$ and the sleeve is maintained even after the deformation of the sleeve 53. This guarantees the concentric arrangement of the sleeve 53 and flanges 54 and 55 and thereby enhances accurate assembly even after the deformation of the sleeve 43.

When the above magnet roller 50 is applied to a developing device, the sleeve 53 is prevented from rotating with noticeable eccentricity or noticeably oscillating, allowing a desirable toner image to be formed on the image carrier. While the sleeve support surface $D_1$ of each flange 54 or 55 is shown as being cylindrical and parallel to the direction X, it may be inclined, in which case the inner periphery of the sleeve 53 will also be inclined.

The advantages of the illustrative embodiment and more advantageous configurations will be described in relation to the results of experiments. For the experiments, the sleeve 53 was implemented by a drawn member of A6063. The sleeve 53 had an outside diameter of 16 mm and a wall thickness $t_2$ of 0.75 mm. The end portions of the sleeve 53 each was provided with a wall thickness $t_1$ of 0.35 mm by additional machining. The ratio of the thickness $t_1$ to the thickness $t_2$ was 0.35/0.75=0.47, i.e., less than 0.5. One flange 55 was formed of wear-resistant aluminum AHS (trade name) available from Showa Aluminum Corp. The magnet roller had the configuration shown in FIG. 19.

As shown in FIG. 19, the end portion of the sleeve 53 was plastically deformed over a length L of 1 mm in the axial direction. Five different kinds of flanges were prepared and respectively had the tapered surfaces 23 and 24 inclined by the angles θ of 15°, 30°, 45°, 60° and 75° relative to the axis of the magnet roller. The sleeve 53 was affixed to the flanges 54 and 55 by the pressing device of FIG. 25 whose pressure F was 3 MPa.

Figure 27:
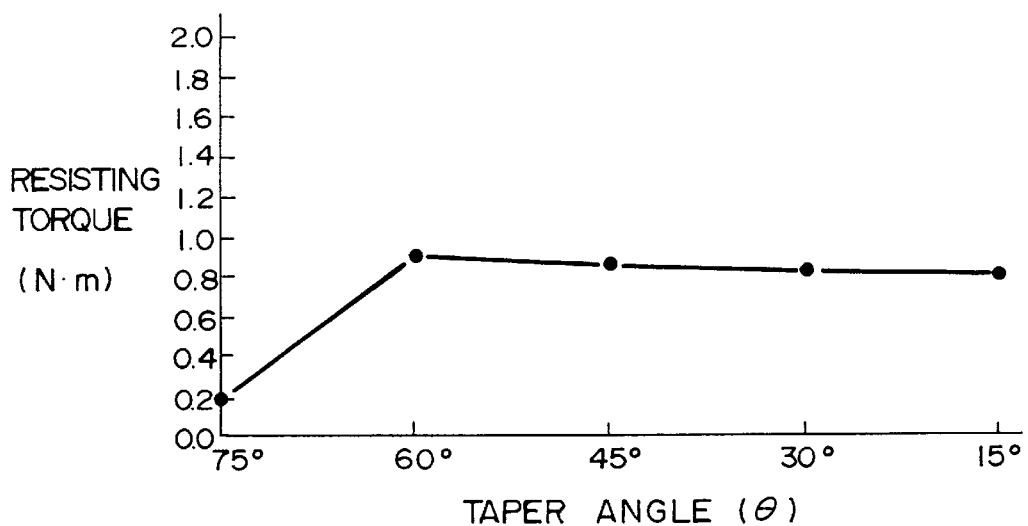
FIG. 27 is a graph showing a relation between the taper angle and the resisting torque.

FIG. 27 shows a relation between the resisting torque of the flange 54 and sleeve 53 of each magnet roller and the taper angle θ of the tapered surface 66.

On the other hand, extended studies and experiments executed with such a number of magnet rollers showed that when the end portions of the sleeve 53 is plastically deformed along the tapered surfaces 65 and 66 by the pressing device, the portions of the sleeve 53 adjoining the bent end portions each slightly bulges out in the radial direction of the sleeve 53 and forms a projection, as stated earlier with reference to FIG. 9. The size of the projection depends on the taper angle θ of the tapered surfaces, as also determined by the experiments. The projection would bring about the previously discussed problems if noticeable.

Figure 28:
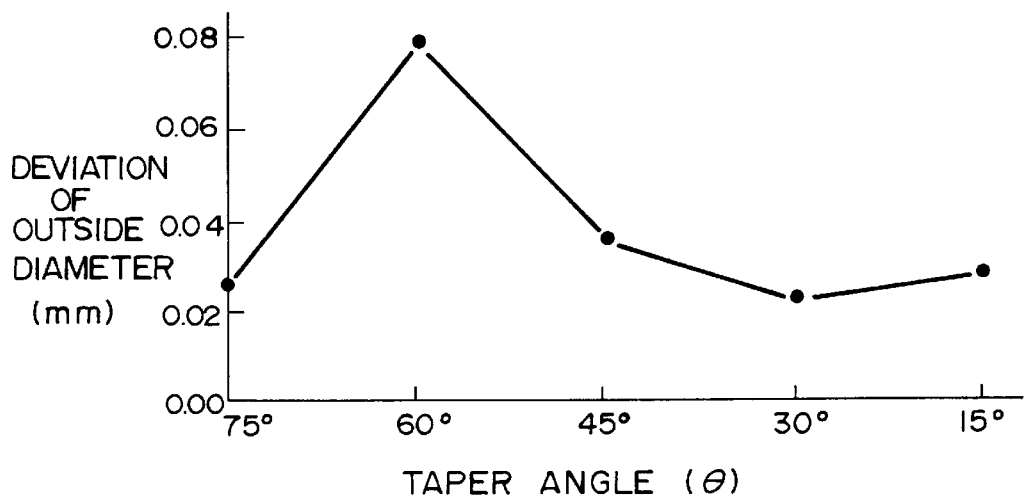
FIG. 28 is a graph showing a relation between the taper angle and the deviation of outside diameter.

FIG. 28 shows a relation between the above projection of the sleeve 53 and the taper angle θ of the tapered surface and determined by the experiments. In FIG. 28, the ordinate indicates a deviation of outside diameter representative of a difference between the outside diameter of the projection and the preselected diameter of the sleeve. As shown, the deviation of outside diameter decreases with a decrease in the taper angle θ of the tapered surface 65 or 66 and is smallest when the taper angle θ is 30°. Experimental results show that when the taper angle is between 25° and 35°, the deviation of outside diameter can be maintained small and allows the seal 7 to exhibit its expected function.

On the other hand, FIG. 27 indicates that a high resisting torque is achievable if the taper angle θ is less than 60° inclusive. When the taper angle θ is 75°, the angle θ of the shaping surface 28 of the die 11, FIG. 25, is close to 90° and cannot bend the end portions of the sleeve 53 to the desired angle; the resulting resisting torque is extremely low, as shown in FIG. 27. Further, when the taper angle θ is 15°, the bending angle of the end portions of the sleeve 53 also decreases and reduces the pull strength, compared to the case with the taper angle θ of 20° to 60°. In this manner, to implement a great resisting torque and a great pull strength, the taper angle θ should preferably range from 20° to 60°.

It will be seen from the above that an ideal magnet roller with a great resisting torque and a great pull strength and with a minimum of projection is attainable if the angle θ of the tapered surfaces 65 and 66 relative to the axis of the magnet roller is between 25° and 35°.

Figure 29:
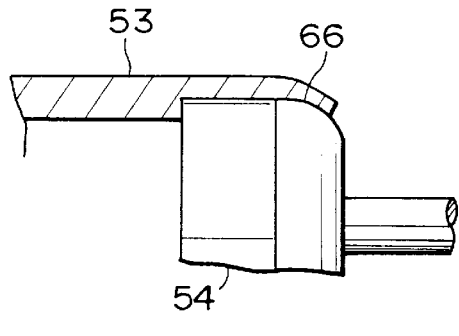
FIGS. 29–34 are sections each showing a particular modification of the end member.

As shown in FIG. 29, the tapered surfaces 65 and 66 of the flanges 54 and 55, respectively, each may be provided with curvature, in which case the sleeve 53 will be plastically deformed accordingly. The curvature increases the contact area between each flange 54 and the associated portion of the sleeve 53 and therefore the resisting torque.

Figure 30:
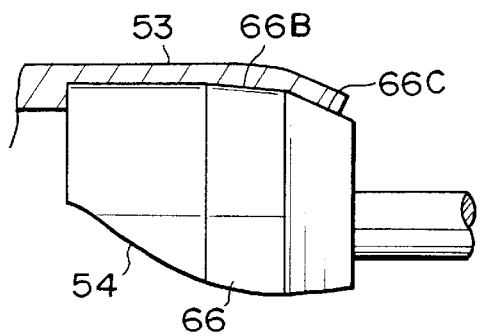
Figure 31:
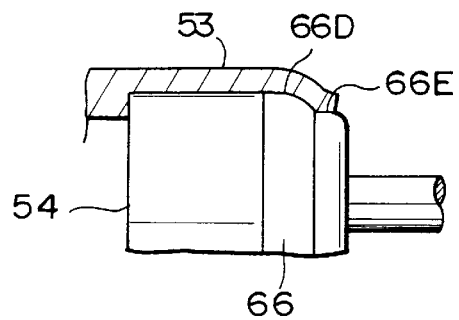
Figure 32:
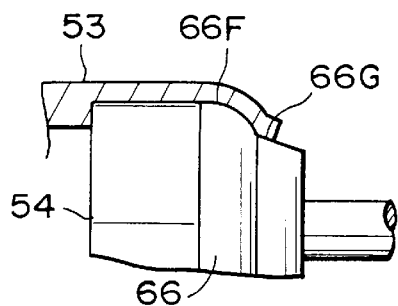

The tapered surfaces 65 and 66 each may be modified, as follows. FIG. 30 shows the tapered surface 66 made up of two contiguous surfaces 66B and 66C each having a particular taper angle. The surfaces 66B and 66C also increases the contact area between the flange 54 and sleeve 53 and therefore the resisting torque. In FIG. 30, the surface 66B closer to the center of the magnet roller in the axial direction is provided with a smaller taper angle than the surface 66C. FIG. 31 shows the tapered surface 66 consisting of two curved portions 66D and 66E. FIG. 32 shows the tapered surface 66 consisting of a curved portion 66F and a straight portion 66G.

Figure 33:
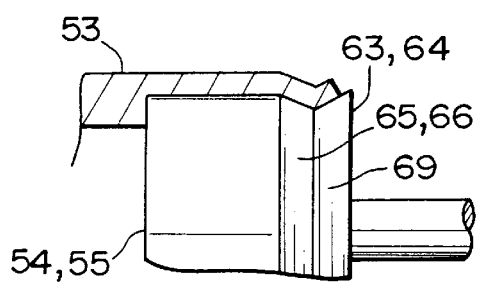
Figure 34:
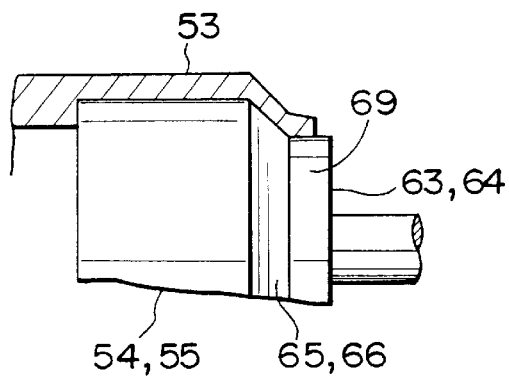

In any one of the above configurations, as shown in FIGS. 33 and 34, each flange 54 or 55 may additionally include an outer circumferential surface 69 remotest from the axial center C, FIG. 19, of the magnet roller, in which case the sleeve 53 will be plastically deformed along the surface 69. In FIG. 33, the surface 69 is flared toward the end 63 or 64 of the flange 54 or 55. In FIG. 34, the surface 69 is cylindrical and parallel to the axis of the magnet roller.

As shown in FIGS. 19 and 25, each end of the sleeve 53 has the wall thickness $t_1$ smaller than the wall thickness $t_2$ of the intermediate portion of the sleeve 53. In any one of the above configurations, the thickness $t_1$ may be made less than one half of the thickness $t_2$. When the ends of the sleeve 53 are sufficiently thinner than the intermediate of the same, they can be fully bent by a small force at the time of plastic deformation and firmly affixed to the tapered surfaces 65 and 66.

By contrast, when the ratio $t_1/t_2$ is greater than 0.5 inclusive, it is sometimes difficult for the pressing device to fully deform the ends of the sleeve 53, reducing the coupling strength between the tapered surfaces 65 and 66 and the deformed sleeve portions. If the pressing force for plastic deformation is increased, then the sleeve 53 can be fully deformed. This, however, aggravates the projection problem discussed with reference to FIG. 9.

In any one of the above configurations, as shown in FIG. 19, the length L over which each end of the sleeve 53 contacts the flange 54 or 55 is selected to be 1 mm or above, e.g., 2 mm. Such a length L increases the contact area between the end of the sleeve 53 and the flange 54 or 55 and therefore the coupling strength. If the length L is less than 1 mm, then both the pull strength and resisting torque are lowered, as determined by a series of experiments.

Figure 35:
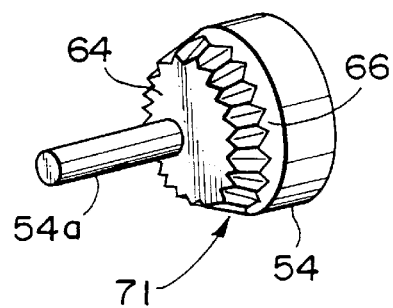
FIG. 35 is a perspective view of an end member formed with incisions.

In any one of the above configurations, incisions may advantageously be formed in the circumferential surface of at least one of the flanges 54 and 55. Specifically, FIG. 35 shows incisions 71 formed in the tapered surface 66 of the drive flange 54. When the end portion of the sleeve 53 is bent and engaged with the tapered surface 66, the firm connection of the sleeve 54 and drive flange 54 and therefore the resisting torque can be further enhanced. While the incisions 71 are applicable to one or both of the drive flange 54 and driven flange 55, they are particularly effective when applied to the drive flange 54 which needs a greater resisting torque than the driven flange 55.

Figure 36:
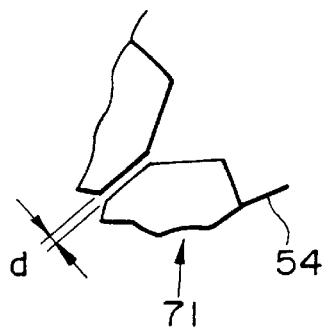
FIG. 36 is an enlarged view of one of the incisions shown in FIG. 35.

One of the above incisions 71 is shown in FIG. 36 in an enlarged scale. As shown, assume that the top of a projection adjoining the incision 71 has a width d in the circumferential direction of the drive flange 54. Then, the firm connection of the tapered surface and sleeve 53 is more enhanced as the width d decreases. Experiments showed that a particularly great resisting torque is achievable when the width d is less than 0.2 mm inclusive. The incisions 71 shown in FIG. 35 can be easily implemented by knurling.

For experiment, the drive flange 54 formed of aluminum was formed with the tapered surface 66 having a taper angle θ of 30°. The tapered surface 66 was knurled to form the incisions 71 having the above width d of 0.2 mm. Then, the sleeve 53 was plastically deformed by the pressing device of FIG. 25 operable with the pressing force F of 3 MPa. The resulting resisting torque was measured to be 2.4 N.m to 2.6 N-m which was about three times as great as the resisting torque available with the tapered surface 66 lacking the incisions 71.

When the end portion of the sleeve 53 and drive flange 54 were affixed together by selecting a width d of 0.8 mm, the resisting torque was lowered to about ¾(1.8 N.m) of the resisting torque available with the width d of 0.2 mm.

In any one of the foregoing configurations, at least one circumferential groove may be formed in the circumferential surface of at least one of the flanges 54 and 55 so as to further enhance the coupling strength between the plastically deformed sleeve portions and flanges 54 and 55. For example, FIGS. 37 and 38 show a circumferential groove 72 formed in the tapered surface 66 of the drive flange 54 together with the incisions 71.

Specifically, assume that the die 11 shown in FIG. 25 is retracted away from the sleeve 53 after the plastic deformation of the sleeve 53. Then, the sleeve 53 freed from the pressing force is apt to loosen relative to the flange due to spring-back. As a result, a small play is apt to occur between the flange and the sleeve 53 although it may not lower the resisting torque. A developing device with such a magnet roller would render the density of a toner image formed on the photoconductive element irregular.

Figure 37:
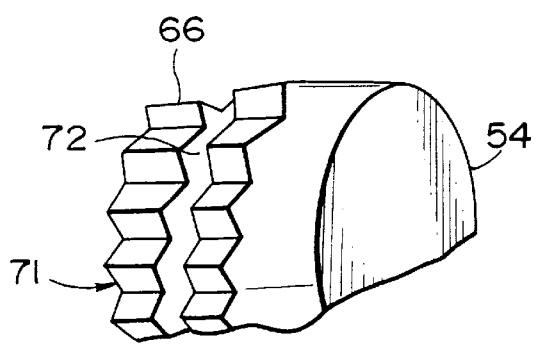
FIG. 37 is a perspective view showing an end member formed with a groove.
Figure 38:
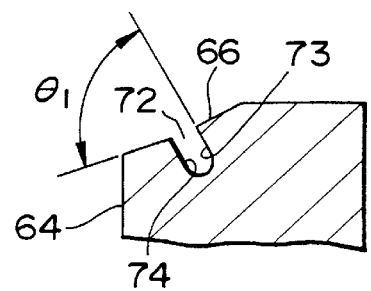
FIG. 38 is a fragmentary section of the end member shown in FIG. 37.

At the time of plastic deformation of the sleeve 53, the groove 72 shown in FIGS. 37 and 38 allows the sleeve 53 to bite into the groove 72 and thereby increases the coupling strength for eliminating the spring-back. In addition, when an extraneous force tending to cause the flange 54 to slip out of the sleeve 53 in the axial direction acts on the flange 54, the edges of the groove 72 extending in the circumferential direction of the flange 54 rigidly engage with the sleeve 53 and prevent the flange 54 from slipping out. As shown in FIG. 38, the groove 72 is defined by a pair of side walls 73 and 74. Experiments showed that when an angle $\theta_1$ between the side wall 73 remote from the outer end 64 of the flange 54 and the tapered surface 66 is less than 90° inclusive, the upper edge of the side wall 73 and sleeve 53 firmly engage with each other and effectively increase the pull strength and resisting torque.

While the groove 72 is also applicable to one or both of the flanges 54 and 55, it is particularly effective when applied to the drive flange 54 needing a great resisting torque.

Assume that the magnet roller has the sleeve 54, magnet 52, and two flanges 54 and 55, that at least one of the flanges 54 and 55 is formed with the tapered surface 65 or 66, and that the tapered surface 65 or 66 is formed with the incisions 71. This kind of magnet roller can be produced by the pressing device shown in FIG. 25. Assume that the inclined surface 11a of the die 11 is simply flat despite the incisions 71 of the flange. Then, particularly when the flange is formed of a material higher in hardness than the sleeve 53, e.g., wear-resistant aluminum, then the sleeve 53 sometimes fails to bite deep into the incisions 71 or implement a desired resisting torque at the time of plastic deformation of the sleeve 53. Although the force pressing the die 11 against the sleeve 53 may be increased in order to increase the resisting torque, such a force is apt to undesirably bend the sleeve 53.

Figure 39:
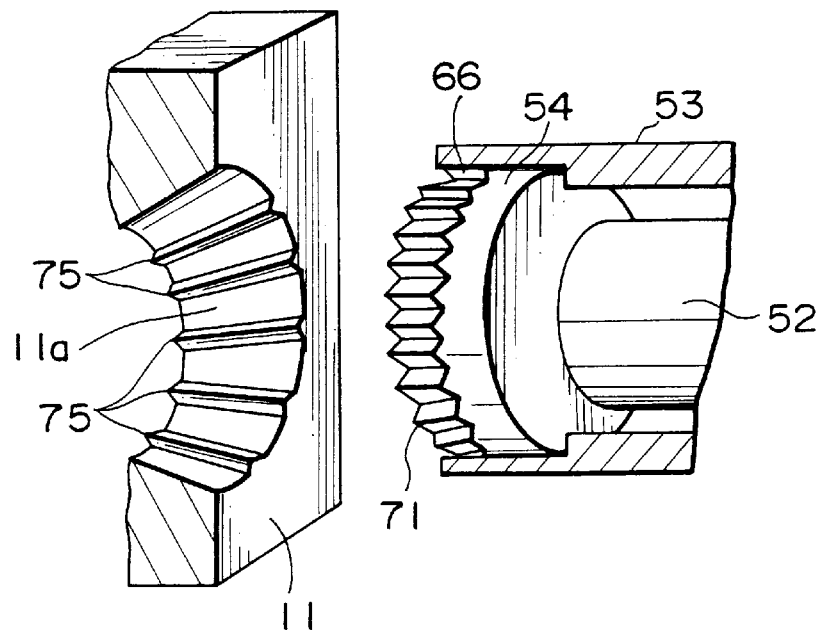
FIGS. 39 and 40 are perspective views each showing a specific configuration of a shaping or pressing surface.

In light of the above, as shown in FIG. 39, ridges 75 are formed on the inclined surface 11a of the die 11. When the end of the sleeve received the flange including the tapered surface is pressed and plastically deformed by the inclined surface 11a, the ridges 75 press themselves against the sleeve 53 with a high pressure for a unit area. Consequently, the sleeve 53 can bite deep into the incisions of the flange 54 and firmly engage with the flange 54.

As shown in FIG. 39, assume that the ridges 75 formed on the inclined surface 11a of the die 11 extend in parallel to the incisions 71 of the flange 54. Then, the incisions 71 and ridges 75 can mate with each other and allow the sleeve 53 to effectively bite into the incisions 71. This further enhances the coupling strength between the sleeve 53 and the flange 54.

Figure 40:
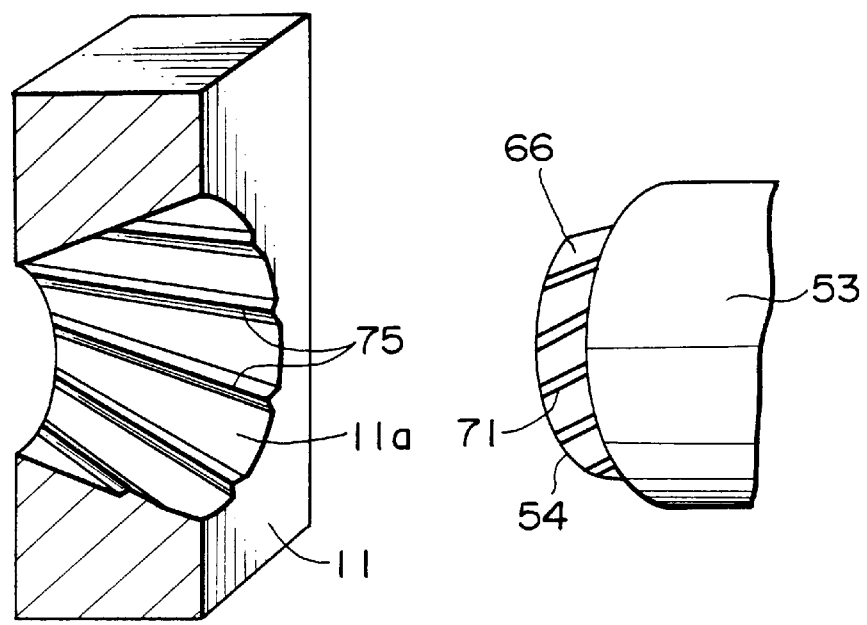

It is, however, difficult to cause the incisions 71 and ridges 75 to mate with each other. For this reason, as shown in FIG. 40, the ridges 75 are so positioned as to intersect the incisions 71 with an angle greater than 0°. This configuration allows a small force to set up firm engagement between the sleeve 53 and the incisions 71 even though the notches 71 and ridges 75 may not mate with each other.

While the configuration shown in FIGS. 39 and 40 is applicable to one or both of the flanges 54 and 55, it is particularly effective when applied to the drive flange 54 needing a great resisting torque.

Figure 41:
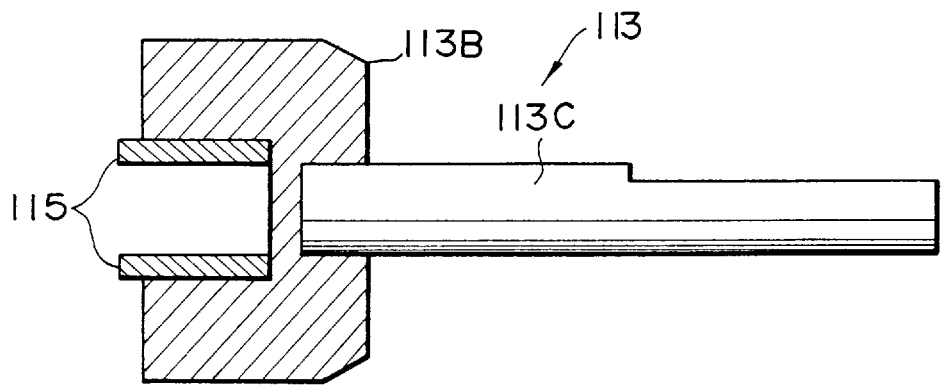
FIG. 41 is an enlarged section showing a drive flange included in a roller representative of another alternative embodiment of the present invention.
Figure 42:
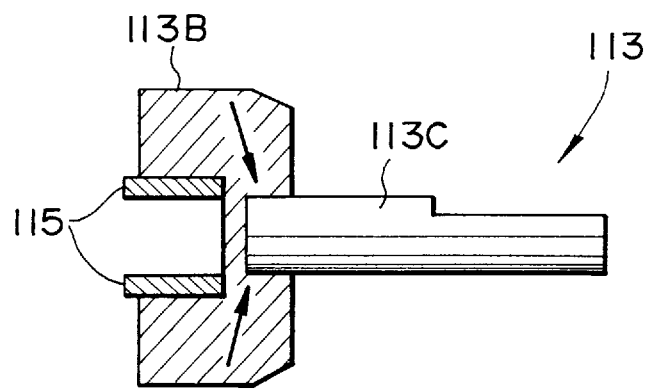
FIG. 42 shows how a drive shaft is firmly buried in a flange body by die casting.

Another alternative embodiment of the present invention, particularly an arrangement for mounting a drive shaft to a drive flange, will be described hereinafter. As shown in FIG. 41, a drive flange 113 has a flange body 113B and a drive shaft 113C molded independently of each other. The drive shaft 113C is buried in the center of the end face of the flange body 113B by die casting. The drive shaft 113C is coaxial with the flange body 113B and connected to a drive source not shown.

The flange body 113B and drive shaft 113C each is formed of a particular material. For example, the flange body 113B and drive shaft 113C are respectively formed of an aluminum alloy or a zinc alloy and a wear-resistant alloy. The flange body 113B is provided with a greater coefficient of thermal expansion than the drive shaft 113C. It follows that when the drive shaft 113C is buried in the flange body 113B by die casing, the flange body 113B rigidly clamps the drive shaft 113C because of its great coefficient of thermal expansion, i.e., great thermal contraction. This prevents the drive shaft 113C from slipping out of the flange body 113B or from idling.

Figure 43:
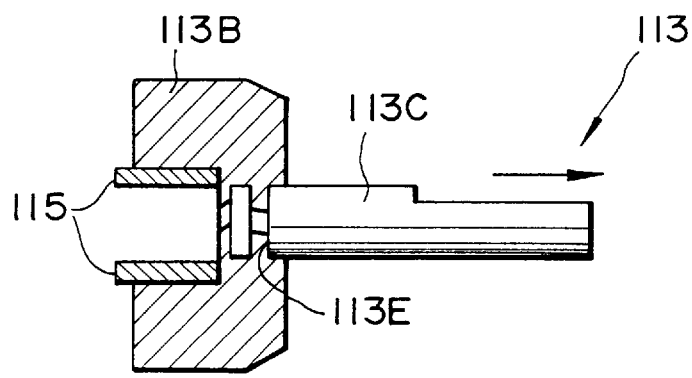
FIGS. 43 and 44 each shows another specific configuration of the drive shaft.

As shown in FIG. 43, a groove 113E may be formed in the end portion of the drive shaft 113C to be buried in the flange body 113B. When the drive shaft 113C with the groove 113E is buried in the flange body 113B by die casting, the groove 113E increases the strength in a direction indicated by an arrow and thereby effectively prevents the drive shaft 113C from slipping out of the flange body 113B. It is to be noted that the groove 113E should only be shallow enough to form a stepped portion.

Figure 44:
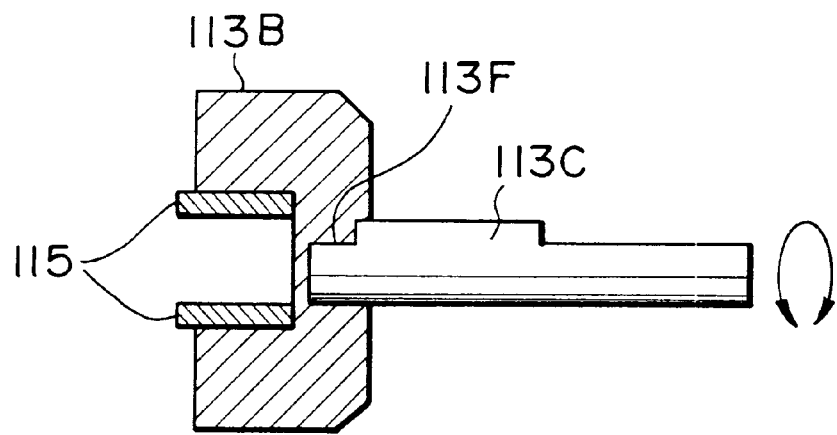

As shown in FIG. 44, a flat portion 113F may be formed on the end portion of the drive shaft 113C to be buried in the flange body 1131B. When the drive shaft 113C with the flat portion 113F is buried in the flange body 113B, the flat portion 113F increases the strength against rotation in a direction indicated by an arrow and thereby effectively prevents the drive shaft 113C from idling. The flat surface 113F is generally referred to as a D cut surface.

Figure 45:
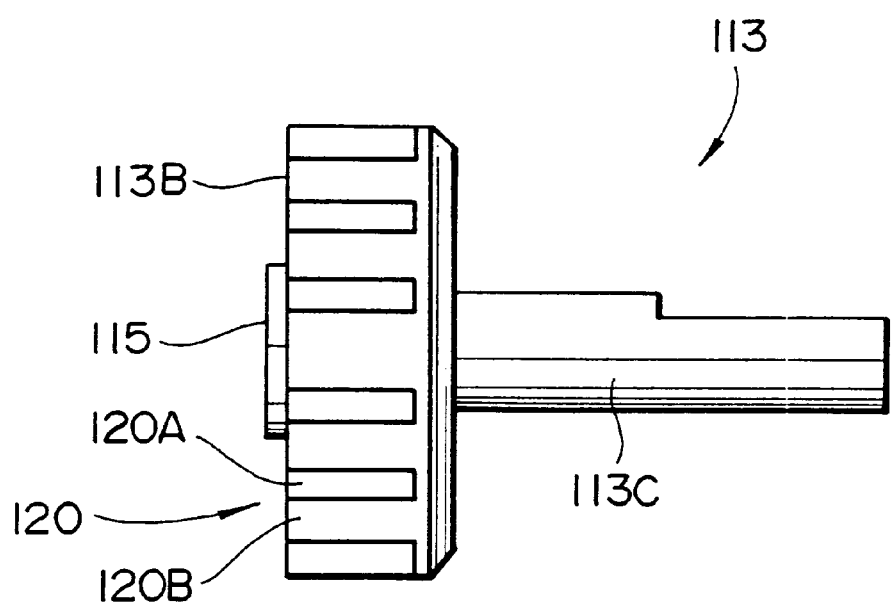
FIG. 45 is an enlarged section showing a modified form of the drive flange.

As shown in FIG. 45, projections and recesses 120 may be formed on the circumferential surface of the flange body 113B. When the drive flange 113 is press-fitted in the shoulder portion of a developing sleeve, the flange 113 does not have to be noticeably tilted. This prevents the circumferential surface of the flange body 113B and shoulder portion from biting each other. In addition, even if adhesive is present, it does not bulge out because the drive flange 113 is not noticeably tilted.

At the time of die casting of the drive flange 113, projections 120B and recesses 120A corresponding to the recesses and projections 120 may be formed on a die. This allows the projections and recesses 120 to be easily formed on the circumferential surface of the flange body 113B and thereby reduces the cost of the drive flange 113.

Figure 46:
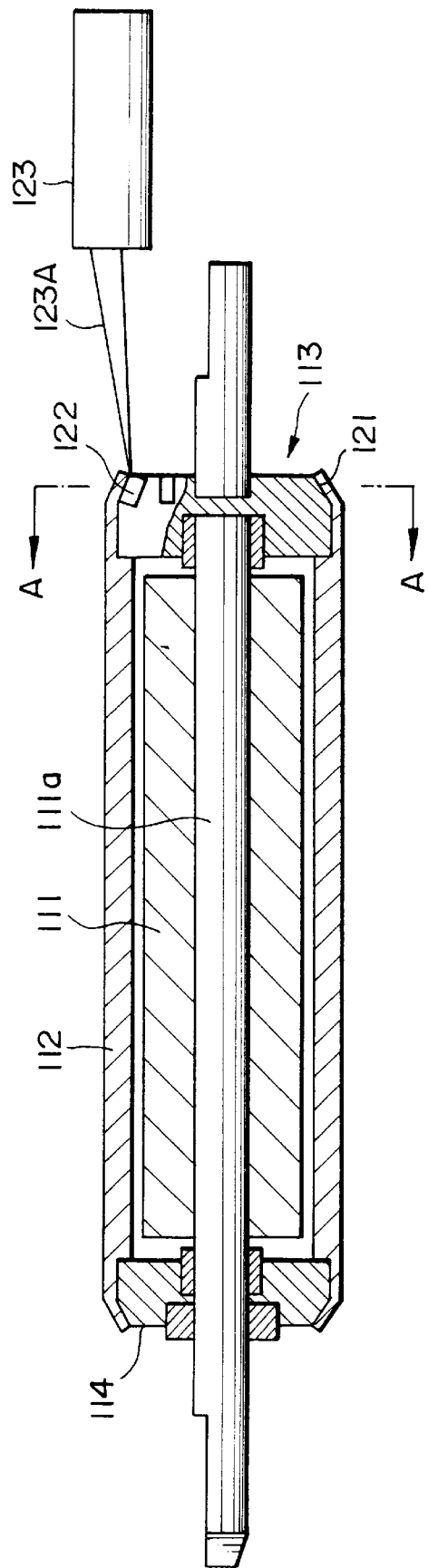
FIG. 46A is a section of a developing roller in which the flange body has its edge chamfered and is formed with projections and recesses on the chamfered portion.
FIG. 46B is a section along line A—A of FIG. 46A.
Figure 47:
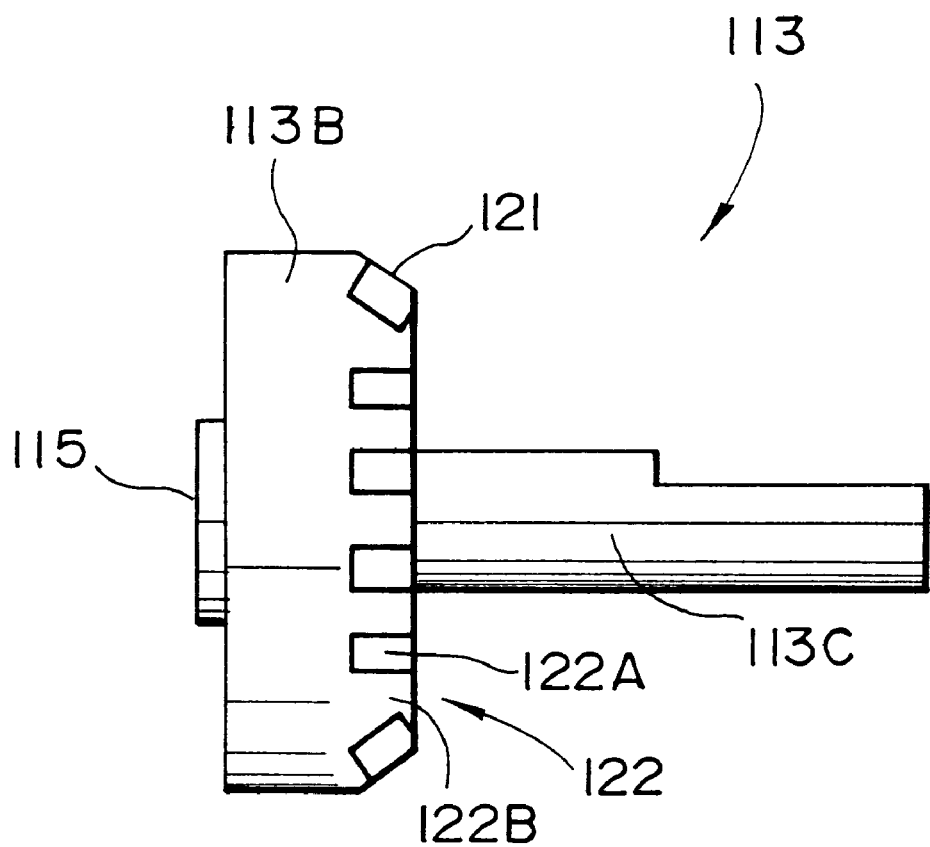
FIG. 47 is an enlarged side elevation showing a drive flange included in the developing roller.

As shown in FIGS. 46A and 46B, the edge of the flange body 113B may be chamfered and formed with projections and recesses 122 on the chamfered edge labeled 122. Specifically, as shown in FIG. 47, a plurality of recesses 122A and a plurality of projections 122B extend in the axial direction of the drive flange 113. After the drive flange 113 has been inserted into a developing sleeve 112, the end portion of the sleeve 112 is pressed inward onto the drive flange 113. At this instant, as shown in FIG. 46B, the inner periphery of the sleeve 112 bites into the projection and recesses 122 and firmly engages with the drive flange 113. After the pressing operation, a nozzle 123A included in an adhesive applying device may be sequentially inserted into the recesses 122A in order to apply adhesive. The adhesive will further enhance the firm engagement between the drive flange 113 and the sleeve 112.

The above projections and recesses 122 have customarily been formed by knurling or similar post-treatment. By contrast, the drive flange 113 produced by die casing does not need any post-treatment and therefore reduces the number of steps and cost.

In the illustrative embodiment, the flange body 113B and drive shaft 113C are respectively formed of, e.g., an aluminum alloy and a wear-resistant alloy, as stated earlier. This successfully reduces the amount of costly wear resistant alloy to be used and therefore the cost and weight of the drive flange 113. In addition, because not the entire drive flange 113 is produced from a highly wear-resistant aluminum alloy, the flange 113 is free from a machining accuracy problem.

If desired, the flange body 113B and drive shaft 113C may be formed of a zinc alloy and a wear-resistant alloy, respectively. A zinc alloy, like an aluminum alloy, is light weight and inexpensive and therefore contributes to the reduction of the cost and weight of the drive flange 113. Further, a zinc alloy is more feasible for precision machining, the projections and recesses 120 or 122 can be molded with a sharp configuration. Therefore, the drive flange 113 can be firmly retained by the developing sleeve 112.

It is to be noted that any one of the illustrative embodiments is applicable not only to the developing device of an image forming apparatus but also to a cleaning device any other mechanical device.

Various modifications will become possible for those skilled in the art after receiving the teachings of the present disclosure without departing from the scope thereof.

What is claimed is:

1. A cylindrical structural body comprising:

a cylindrical sleeve; and an end member affixed to an end portion of said sleeve in an axial direction of said sleeve;

said end member including a tapered portion tapered toward an end thereof in an axial direction of said cylindrical structural body over an entire circumference of said tapered portion;

said end portion of said sleeve being plastically deformed such that an inner periphery of said end portion closely contacts said tapered portion of said end member, whereby said end portion is affixed to said end member.

2. A cylindrical structural body as claimed in claim 1, wherein said end member includes a sleeve support surface close to an axial center of said cylindrical structural body for contacting the inner periphery of said sleeve to thereby maintain accurate connection of said end member and said sleeve.

3. A cylindrical structural body as claimed in claim 1, wherein said sleeve includes a shoulder formed by an end, close to an axial center of said cylindrical structural body, of a portion of said sleeve surrounding said end member and a portion adjoining said end and having a smaller inside diameter than said end.

4. A cylindrical structural body as claimed in claim 1, wherein an axial end of said end portion of said sleeve closely contacting said tapered portion of said end member is positioned closer to an axial center of said cylindrical structural body than said end of said end member.

5. A cylindrical structural body as claimed in claim 1, wherein said end portion of said sleeve closely contacting said tapered portion of said end member has a wall thickness sequentially increasing toward the end of said end portion in the axial direction of said cylindrical structural body.

6. A cylindrical structural body as claimed in claim 1, wherein said tapered portion of said end member is inclined by a preselected angle relative to the axial direction of said cylindrical structural body.

7. A cylindrical structural body as claimed in claim 6, wherein said angle of said tapered portion is different from an angle by which an outer periphery of said end portion of said sleeve is inclined relative to the axial direction of said cylindrical structural body.

8. A cylindrical structural body as claimed in claim 7, wherein said angle of said outer periphery of said sleeve is smaller than said angle of said tapered portion of said end member.

9. A cylindrical structural body as claimed in claim 1, wherein said tapered portion of said end member comprises a plurality of inclined surfaces each having a particular angle of inclination relative to the axial direction of said cylindrical structural body.

10. A cylindrical structural body as claimed in claim 9, wherein the angle of inclination sequentially decreases from the inclined surface remotest from an axial center of said cylindrical structural body toward the inclined surface nearest to said axial center.

11. A cylindrical structural body as claimed in claim 1, wherein said tapered portion of said end member has a curved surface.

12. A cylindrical structural body as claimed in claim 1, wherein said end portion of said sleeve surrounding said end member includes a radially outward circumferential projection on an outer periphery thereof.

13. A cylindrical structural body as claimed in claim 12, wherein said end member includes a sleeve support surface close to the axial center of said cylindrical structural body for contacting the inner periphery of said sleeve to thereby maintain accurate connection of said end member and said sleeve.

14. A cylindrical structural body as claimed in claim 13, wherein said projection is formed in a portion of said sleeve surrounding said sleeve support surface.

15. A cylindrical structural body as claimed in claim 1, wherein said tapered portion of said end member is inclined by a preselected angle relative to the axial direction of said cylindrical structural body.

16. A cylindrical structural body as claimed in claim 15, wherein said preselected angle ranges from 25° to 35°.

17. A cylindrical structural body as claimed in claim 1, wherein said end member includes an outer circumferential surface remoter from the axial center of said cylindrical structural body than said tapered portion, said sleeve being plastically deformed along said outer circumferential surface.

18. A cylindrical structural body as claimed in claim 1, wherein said end portion of said sleeve closely contacting said end member has a wall thickness less than one half, inclusive, of a wall thickness of the other portion of said sleeve.

19. A cylindrical structural body as claimed in claim 1, wherein said end portion of said sleeve closely contacts said end member over a length of greater than 1 mm inclusive.

20. A cylindrical structural body as claimed in claim 1, wherein a circumferential surface of said end member contacting said end portion of said sleeve is formed with circumferentially spaced incisions.

21. A cylindrical structural body as claimed in claim 20, wherein projections between said incisions each has a top having a width of less than 0.2 mm inclusive in a circumferential direction of said end member.

22. A cylindrical structural body as claimed in claim 20, wherein said incisions are formed by knurling.

23. A cylindrical structural body as claimed in claim 1, wherein at least one circumferential groove is formed in a circumferential surface of said end member.

24. A cylindrical structural member as claimed in claim 23, wherein said tapered portion of said end member is inclined by a preselected angle relative to the axial direction of said cylindrical structural member.

25. A cylindrical structural body as claimed in claim 24, wherein one of opposite side walls delimiting said circumferential groove remoter from an outer end of said end member than the other side wall is inclined by less than 90° inclusive relative to said tapered portion of said end member.

26. In a method of producing a cylindrical structural body including a cylindrical end member and a cylindrical sleeve by pressing an axial end portion of said sleeve against said end member, said end portion of said sleeve is pressed against a frustoconical inclined surface formed at one axial end of said end member concentrically with said end member.

27. A method as claimed in claim 26, wherein said end portion of said sleeve contacting said inclined surface of said end member is inclined relative to an axial direction of said cylindrical structural body by an angle different from an angle of inclination of said inclined surface.

28. A method as claimed in claim 27, wherein an outer periphery of said end portion of said sleeve is inclined relative to the axial direction of said cylindrical structural body by an angle smaller than an angle of inclination of said inclined surface of said end member.

29. A method as claimed in claim 26, wherein an assembly of said sleeve and said end member received in said end portion of said sleeve is inserted into a pressing device including a die having a conical bore for pressing, and then said end portion of said sleeve surrounding said end member is press-fitted in said bore of said die to thereby press said end portion of said sleeve.

30. A method as claimed in claim 29, wherein after insertion of said assembly into said pressing device, while a portion of said end portion of said sleeve surrounding a cylindrical portion of said end member has an outer periphery thereof held by said pressing device over a substantially entire surface, said end portion of said sleeve surrounding said inclined surface of said end member is press-fitted in said bore of said die to thereby press said end portion of said sleeve.

31. A method as claimed in claim 29, wherein said end portion of said sleeve has a greater inside diameter than an intermediate portion of said sleeve to thereby form a shoulder, and wherein after an end of said end member opposite to said inclined surface has been abutted against said shoulder, said end portion of said sleeve is pressed with an end of a knock-out member included in said die pressing an end of said end member.

32. A method as claimed in claim 29, wherein after said end portion of said sleeve has been pressed, a pressure being exerted on said sleeve by said pressing device is cancelled, and then a knock-out member included in said die presses an end of said end member to thereby release said cylindrical structural body from said die.

33. A method as claimed in claim 32, wherein said die includes a conical bore for pressing, a knock-out member slidably received in a circular hole formed in a center of said bore, and a presser for pressing a rear end of said knock-out member, said pressing device further comprising:

a guide holder mounted on said die concentrically with said bore and formed with a screw-thread in an inner periphery thereof, said guide holder being constantly biased by a spring toward an end of said die and movable toward and away from said die; and a guide having a collet chuck structure and held in threaded engagement with said screw-thread of said guide holder.

34. A method as claimed in claim 29, wherein said pressing device presses said end portion of said sleeve such that said end portion contacts said inclined surface of said end member and such that an outer periphery of said end portion of said sleeve is inclined relative to an axial direction of said end member by an angel different from an angle of inclination of said inclined surface.

35. A method as claimed in claim 34, wherein said pressing device presses said end portion of said sleeve such that the outer periphery of said end portion of said sleeve is inclined by a smaller angle than said inclined surface.

36. A method as claimed in claim 29, wherein said die includes a conical bore having an inclined surface inclined by a smaller angle than said inclined surface of said end member, and wherein said end portion of said sleeve surrounding said inclined surface of said end portion is press-fitted in said bore to thereby press said end portion of said sleeve.

37. A method as claimed in claim 36, wherein after insertion of said assembly into said pressing device, while a portion of said end portion of said sleeve surrounding a cylindrical portion of said end member has an outer periphery thereof held by said pressing device over a substantially entire surface, said end portion of said sleeve surrounding said inclined surface of said end member is press-fitted in said bore of said die to thereby press said end portion of said sleeve.

38. In a method of producing a cylindrical structural body including a cylindrical sleeve and an end member affixed to an end portion of said sleeve in an axial direction of said sleeve, said end member having a circumferential surface including a tapered surface tapered toward an outside end of said end member remotest from an axial center of said cylindrical structural body, said tapered surface being formed with incisions at circumferentially spaced locations, said end member is inserted in said end portion of said sleeve, and then said end portion of said sleeve is pressed against a shaping surface corresponding in shape to said tapered surface and including a projection to thereby cause said end portion of said sleeve to plastically deform complementarily to said tapered surface.

39. A method as claimed in claim 38, wherein said projection comprises a plurality of ridges extending in parallel to said incisions when said end portion of said sleeve is plastically deformed.

40. A method as claimed in claim 39, wherein said plurality of ridges intersect said incisions with an angle of greater than 0° when said end portion of said sleeve is plastically deformed.

41. A developing roller comprising:
   a cylindrical sleeve; and
   an end member affixed to an end portion of said sleeve in an axial direction of said sleeve;
   said end member including a tapered portion tapered toward an end in an axial direction of said developing roller over an entire circumference of said tapered portion;
   said end portion of said sleeve being plastically deformed such that an inner periphery of said end portion closely contacts said tapered portion of said end member, whereby said end portion is affixed to said end member.

42. A developing roller as claimed in claim 41, wherein said end member includes a sleeve support surface close to an axial center of said developing roller for contacting the inner periphery of said sleeve to thereby maintain accurate connection of said end member and said sleeve.

43. A developing roller as claimed in claim 41, wherein said sleeve includes a shoulder formed by an end, close to an axial center of said developing roller, of a portion of said sleeve surrounding said end member and a portion adjoining said end and having a smaller inside diameter than said end.

44. A developing roller as claimed in claim 41, wherein said end portion constitutes a non-image portion where a developer will not be deposited, while a portion having a smaller inside diameter than said end portion constitutes an image region where the developer will be deposited.

45. A developing roller as claimed in claim 41, wherein an axial end of said end portion of said sleeve closely contacting said tapered portion of said end member is positioned closer to an axial center of said developing roller than said end of said end member.

46. A developing roller as claimed in claim 41, wherein said end portion of said sleeve closely contacting said tapered portion of said end member has a wall thickness sequentially increasing toward the end of said end portion in the axial direction of said developing roller.

47. A developing roller as claimed in claim 41, wherein said tapered portion of said end member is inclined by a preselected angle relative to the axial direction of said developing roller.

48. A developing roller as claimed in claim 47, wherein said angle of said tapered portion is different from an angle by which an outer periphery of said end portion of said sleeve is inclined relative to the axial direction of said developing roller.

49. A developing roller as claimed in claim 48, wherein said angle of said outer periphery of said sleeve is smaller than said angle of said tapered portion of said end member.

50. A developing roller as claimed in claim 49, wherein the angle of said tapered portion and the angle of said outer periphery of said end portion are 33° and 30°, respectively.

51. A developing roller as claimed in claim 41, wherein said tapered portion of said end member comprises a plurality of inclined surfaces each having a particular angle of inclination relative to the axial direction of said developing roller.

52. A developing roller as claimed in claim 51, wherein the angle of inclination sequentially decreases from the inclined surface remotest from an axial center of said developing roller toward the inclined surface nearest to said axial center.

53. A developing roller as claimed in claim 41, wherein said tapered portion of said end member has a curved surface.

54. A developing roller as claimed in claim 41, wherein said end portion of said sleeve surrounding said end member includes a radially outward circumferential projection on an outer periphery thereof.

55. A developing roller as claimed in claim 54, wherein said end member includes a sleeve support surface close to the axial center of said developing roller for contacting the inner periphery of said sleeve to thereby maintain accurate connection of said end member and said sleeve.

56. A developing roller as claimed in claim 55, wherein said projection is formed in a portion of said sleeve surrounding said sleeve support surface.

57. In a method of producing a developing roller including a cylindrical end member and a cylindrical sleeve by pressing an axial end portion of said sleeve against said end member, said end portion of said sleeve is pressed against a frustoconical inclined surface formed at one axial end of said end member concentrically with said end member.

58. A method as claimed in claim 57, wherein said end portion of said sleeve contacting said inclined surface of said end member is inclined relative to an axial direction of said developing roller by an angle different from an angle of inclination of said inclined surface.

59. A developing device comprising:
   a developing roller including a cylindrical sleeve and an end member affixed to one end of said sleeve in an axial direction of said developing roller;
   a setting portion for rotatably setting said developing roller;

a facing member facing said developing roller; and a seal member intervening between said developing roller and said facing member for preventing a developer from leaking to a region other than a region where the developer will be deposited on said developing roller;

wherein said end member comprises a cylindrical portion having a preselected diameter and a tapered portion closer to an end of said developing roller in an axial direction of said developing roller than said cylindrical portion and sequentially tapered toward an end of said end member in the axial direction of said developing roller over an entire circumference, said sleeve having an end thereof in the axial direction of said developing roller plastically deformed such that an inner periphery of said end portion closely contacts a surface of said tapered portion; and wherein said seal member contacts a first and a second portion of said sleeve respectively surrounding said cylindrical portion and said tapered portion of said end member, and contacts said first portion with a higher compressibility than said second portion.

60. A developing device as claimed in claim 59, wherein said seal member is formed of a porous material.

61. A developing device as claimed in claim 59, wherein said second portion of said sleeve has a circumferential projection formed on an outer periphery thereof at a same position in the axial direction of said developing roller.

62. A developing device as claimed in claim 61, wherein said projection is positioned outside of said region of said developing roller where the developer will be deposited.

63. A developing device as claimed in claim 61, wherein said seal member is so arranged as to cause said projection to produce a portion where the compressibility of said seal member increases.

64. A developing device as claimed in claim 61, wherein said seal member is arranged such that said projection bites into said seal member.

65. A developing device as claimed in claim 61, wherein said projection has a height smaller than a distance between said developing roller and an image carrier to which said developing roller feeds the developer.

66. A developing device as claimed in claim 61, wherein said projection has a height ranging from 0.01 mm to 0.005 mm.

67. A developing device as claimed in claim 61, wherein said projection has a length greater than a length of said seal member in the axial direction of said developing roller.

68. A developing device as claimed in claim 59, wherein said facing member is configured to face at least said portion of said developing roller other than said portion where the developer will be deposited, said seal intervening between said facing member and said portion other than said portion where the developer will be deposited.

* * * * *